United States Patent
Matsumoto

(10) Patent No.: US 9,423,667 B2
(45) Date of Patent: Aug. 23, 2016

(54) HIGH-FREQUENCY CIRCUIT AND OPTICAL MODULATOR

(71) Applicant: FUJIKURA LTD., Tokyo (JP)

(72) Inventor: Ryokichi Matsumoto, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/751,453

(22) Filed: Jun. 26, 2015

(65) Prior Publication Data

US 2015/0378238 A1 Dec. 31, 2015

(30) Foreign Application Priority Data

Jun. 30, 2014 (JP) .................................. 2014-135311

(51) Int. Cl.
  *G02F 1/035* (2006.01)
  *G02F 1/225* (2006.01)
  *G02F 1/21* (2006.01)

(52) U.S. Cl.
  CPC ............ *G02F 1/2255* (2013.01); *G02F 1/2257* (2013.01); *G02F 2001/212* (2013.01)

(58) Field of Classification Search
  None
  See application file for complete search history.

(56) References Cited

U.S. PATENT DOCUMENTS 5,652,557 A * 7/1997 Ishikawa .................. H01L 23/66
                                                      333/238
2004/0026738 A1   2/2004 Hasegawa
2006/0035421 A1   2/2006 Hasegawa
2006/0273395 A1  12/2006 Tanaka

FOREIGN PATENT DOCUMENTS

| JO | 2006-229226 A | 8/2006 |
| JP | 8-125412 A | 5/1996 |
| JP | 9-312507 A | 12/1997 |
| JP | 2003-295139 A | 10/2003 |
| JP | 2004-88064 A | 3/2004 |
| JP | 2013-47721 A | 3/2013 |
| WO | 2008/146535 A1 | 12/2008 |

OTHER PUBLICATIONS

Office Action dated Feb. 9, 2016, issued in counterpart Japanese Patent Application No. 2014-135311 (2 pages).
Liu, Liao et al., "40 Gbit/s silicon optical modulator for high-speed applications", Electronics Letters Oct. 25, 2007, vol. 43, No. 22.

* cited by examiner

*Primary Examiner* — Uyen Chau N Le
*Assistant Examiner* — Chad Smith
(74) *Attorney, Agent, or Firm* — Westerman, Hattori, Daniels & Adrian, LLP

(57) ABSTRACT

A high-frequency circuit 10 includes: a termination resistor 12*a* embedded to a surface of a substrate 21; and a signal line 11*a* formed on the surface of the substrate 21, the signal line having a junction segment CJ, the junction segment CJ covering a portion of an upper surface of the termination resistor 12*a* so that at least a portion along a width of the junction segment CJ that extends from the start position to the end position is connected to the termination resistor 12*a*. A width $W_S$ of the signal line 11*a* at the start position of the junction segment CJ is equal to or greater than a width $W_T$ of the upper surface of the termination resistor 12*a* at the start position.

13 Claims, 9 Drawing Sheets

# HIGH-FREQUENCY CIRCUIT AND OPTICAL MODULATOR

This Nonprovisional application claims priority under 35 U.S.C. §119 on Patent Application No. 2014-135311 filed in Japan on Jun. 30, 2014, the entire contents of which are hereby incorporated by reference.

TECHNICAL FIELD

The present invention relates to a high-frequency circuit configured to receive a high-frequency signal from an outside source.

BACKGROUND ART

As cloud services and big data utilization are popularized, information is transmitted through the network in larger and larger quantities. In response to such an increase in quantity of information transmitted, there has been widely spread so-called optical communication, which is information transmission by use of optical signals. Information transmission by use of optical signals allows a further increase in capacity of a transmission path and in transmission speed than information transmission by use of electrical signals.

Optical communication is carried out by use of optical signals obtained by modulating light with electrical signals indicative of information. The optical signals are generated by use of an optical modulator in optical communication. Of various types of existing optical modulators, a Mach-Zehnder (M-Z) optical modulator is often used as an optical modulator for use in optical communication. This is because the M-Z optical modulator has advantages of (i) being less likely to be affected by external noise and (ii) being highly stable in modulation operation with respect to a change in temperature.

The M-Z optical modulator generally includes: an input-side waveguide; an M-Z optical interferometer including an optical modulating section; and an output-side waveguide configured to output modulated light. The M-Z optical interferometer includes two arm sections branching from the input-side waveguide. At least one of the arm sections is provided with an electrode for modulating light. To this electrode, a signal line is connected. The signal line has (i) a first end that is connected to a pulse pattern generator configured to generate a modulating signal and (ii) a second end that is connected to a termination resistor. The termination resistor is provided to suppress the reflection, at the second end of the signal line, of a modulating signal inputted from the first end of the signal line.

The termination resistor is normally equipped by either a method for mounting a resistor on a surface of a substrate of the optical modulator or a method for mounting a resistor on a surface of another substrate electrically connected with the second end of the signal line of the optical modulator. Alternatively, the termination resistor can also be equipped by a known method for forming a resistive element inside a substrate of the optical modulator and connecting the resistive element to the second end of the signal line. Non-patent Literature 1 discloses, for example, a technique in which titanium nitride (TiN) formed inside a silicon (Si) substrate is used as a resistive element. Further, Patent Literatures 1 and 2 each disclose a technique for forming a resistive element by doping an inside of a silicon layer of an SOI (silicon on insulator) wafer with an element (not Si). The method for forming a resistive element inside a substrate is more advantageous than the method for mounting a resistor on a surface of a substrate. This is because the method for forming a resistive element inside a substrate allows the resistive element to use a smaller space on the surface of the substrate and makes it unnecessary to equip the surface of the substrate with a resistive element as a component.

CITATION LIST

Patent Literature

Patent Literature 1
Japanese Patent Application Publication, Tokukai, No. 2004-88064 (Publication Date: Mar. 18, 2004)
Patent Literature 2
Japanese Patent Application Publication, Tokukai, No. 2006-229226 (Publication Date: Aug. 31, 2006)

Non-Patent Literature

Non-Patent Literature 1
"40 Gbit/s silicon optical modulator for highspeed applications", ELECTRONICS LETTERS 25 Oct. 2007, Vol. 43, No. 22

SUMMARY OF INVENTION

Technical Problem

A modulating signal that is inputted to an optical modulator for use in optical communication is a broadband high-frequency signal having a frequency of GHz or higher. In order for the termination resistor connected to the second end of the signal line to suppress the reflection of a modulating signal that is a high-frequency signal, (i) the impedance of an electrode provided to modulate light, (ii) the impedance of the termination resistor, and (iii) the impedance of a circuit line connecting the electrode to the termination resistor (corresponding to a segment of the signal line which segment extends from a traveling-wave electrode to the termination resistor) need to be matched to one another. Note that the following description may express the "circuit line" as "signal line" without distinguishing from the other segments of the signal line.

In a case where a resistive element formed inside a substrate is used as the termination resistor, the signal line and a pair of ground lines provided near the signal line can be coplanarly arranged on a surface of the substrate, whereas the termination resistor is provided so as to be embedded to the surface of the substrate. Note that the termination resistor that is embedded to the surface of the substrate herein refers to the termination resistor that is embedded in an outer layer of the substrate so that an upper surface of the termination resistor is exposed on the outer layer. This causes the signal line to be placed on an upper surface of the termination resistor in a junction region where the signal line and the termination resistor join each other. In other words, the relative arrangement of the signal line, the pair of ground lines, and the termination resistor is not a coplanar arrangement.

This results in the formation, in proximity to the junction region, of a discontinuous structure in which (i) a region where the substrate, which is an insulator, is provided at a layer below the signal line and (ii) a region where the termination resistor, which is an electric conductor, is provided at a layer below the signal line, are adjacent to each other. Since electrical characteristics typified by a dielectric constant and electric conductivity greatly change across a boundary between the different structures, it is difficult to match (i) the impedance of the signal line provided on a surface of the insulator and (ii) the impedance of the signal line provided on an upper surface of the termination resistor. Therefore, there has been such a problem that a high-frequency signal inputted to and propagated through the signal line is reflected at a connection between the signal line and the termination resistor. In a case where the high-frequency signal propagated through the signal line is reflected, the reflected high-frequency signal returns to the optical modulating section and adversely affects the operation of the optical modulator.

The present invention has been made in view of the problems described above, and an object of the present invention is to achieve a high-frequency circuit which includes a terminating resistor embedded to a surface of a substrate and which can suppress the reflection of a high-frequency signal inputted thereto.

Solution to Problem

In order to attain the object, a high-frequency circuit of the present invention includes: a termination resistor embedded to a surface of a substrate; and a signal line formed on the surface of the substrate, the signal line having a junction segment that starts at a start position and ends at an end position, the start position being short of a termination point of the signal line, the end position being the termination point, the junction segment covering a portion of an upper surface of the termination resistor so that at least a portion along a width of the junction segment that extends from the start position to the end position is connected to the termination resistor, a width of the signal line at the start position of the junction segment being equal to or greater than a width of the upper surface of the termination resistor at the start position.

Advantageous Effects of Invention

The present invention can suppress the reflection of a high-frequency signal propagating through a signal line, the reflection being caused by structural discontinuity between a region where a substrate is provided at a layer below the signal line and a region where a termination resistor is provided at the layer below the signal line. This makes it possible to achieve a high-frequency circuit which includes a termination resistor provided inside a substrate and which can suppress the reflection of the inputted high-frequency signal.

BRIEF DESCRIPTION OF DRAWINGS (a) of FIG. 1 is a perspective view illustrating a configuration of a main part of an optical modulator including a high-frequency circuit of Embodiment 1 of the present invention. (b) of FIG. 1 is a cross-sectional view of a first optical modulating section as taken along a line L-L shown in (a) of FIG. 1.

(a) of FIG. 2 is a top view of the high-frequency circuit of Embodiment 1 of the present invention. (b) of FIG. 2 is a cross-sectional view of the high-frequency circuit as taken along a line A-A shown in (a) of FIG. 2. (c) of FIG. 2 is a cross-sectional view of the high-frequency circuit as taken along a line D-D shown in (a) of FIG. 2.

(a) through (e) of FIG. 3 are cross-sectional views of the high-frequency circuit illustrated in FIG. 2. (a) of FIG. 3 is a cross-sectional view of the high-frequency circuit as taken along a line B-B shown in (a) of FIG. 2. (b) of FIG. 3 is a cross-sectional view of the high-frequency circuit as taken along a line C-C shown in (a) of FIG. 2. (c) of FIG. 3 is a cross-sectional view of the high-frequency circuit as taken along a line D-D shown in (a) of FIG. 2. (d) of FIG. 3 is a cross-sectional view of the high-frequency circuit as taken along a line E-E shown in (a) of FIG. 2. (e) of FIG. 3 is a cross-sectional view of the high-frequency circuit as taken along a line F-F shown in (a) of FIG. 2.

(a) of FIG. 4 is a top view of a high-frequency circuit according to Modification 1 of Embodiment 1 of the present invention. (b) of FIG. 4 is a cross-sectional view of the high-frequency circuit as taken along a line G-G shown in (a) of FIG. 4. (c) of FIG. 4 is a cross-sectional view of the high-frequency circuit as taken along a line H-H shown in (a) of FIG. 4.

(a) of FIG. 5 is a top view of a high-frequency circuit according to Modification 2 of Embodiment 1 of the present invention. (b) of FIG. 5 is a cross-sectional view of the high-frequency circuit as taken along a line I-I shown in (a) of FIG. 5. (c) of FIG. 5 is a cross-sectional view of the high-frequency circuit as taken along a line J-J shown in (a) of FIG. 5.

(a) through (d) of FIG. 6 are top views of high-frequency circuits according to further modifications of Embodiment 1 of the present invention.

DESCRIPTION OF EMBODIMENTS

Embodiment 1

Figure 1:
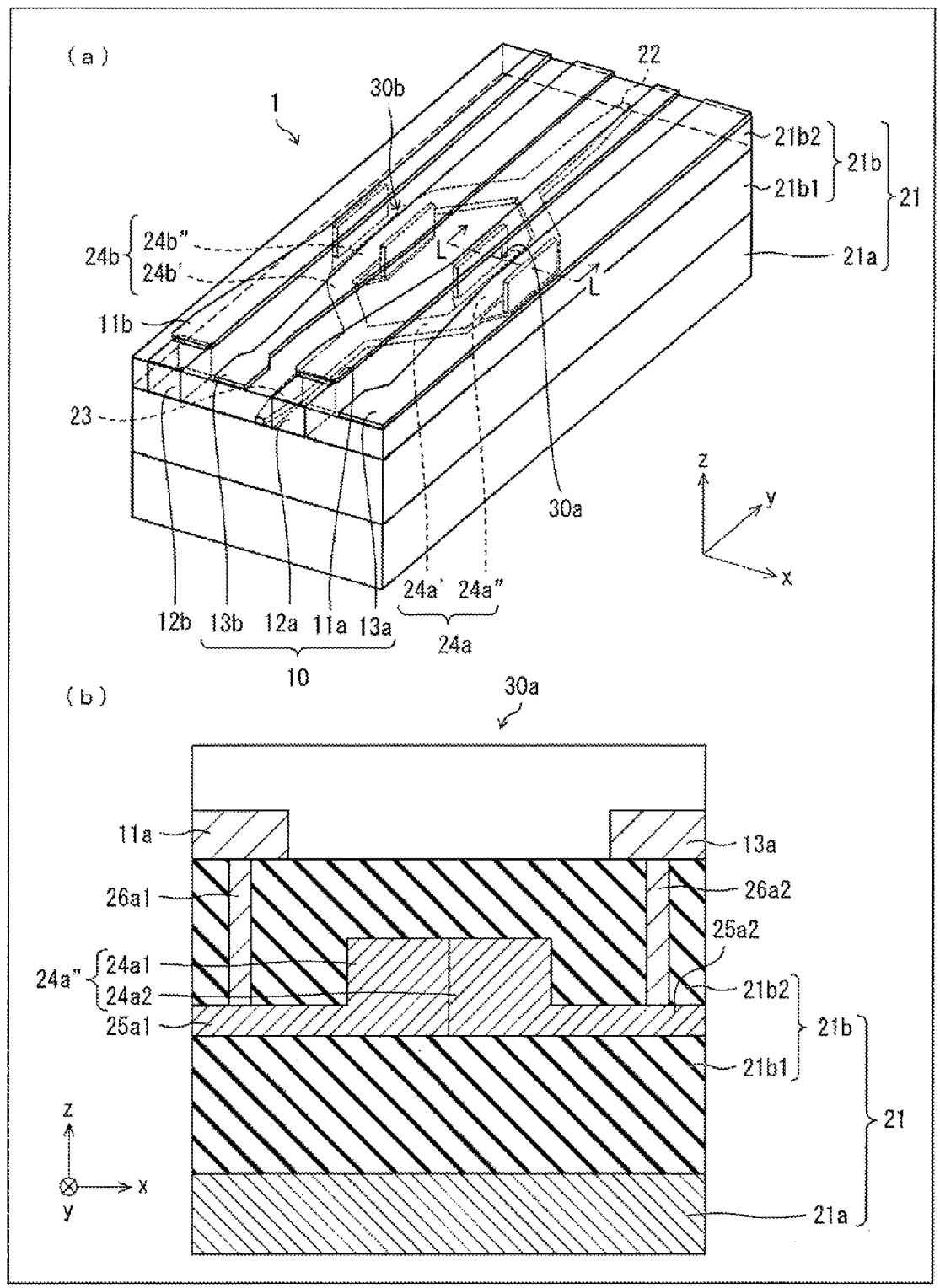
Figure 2:
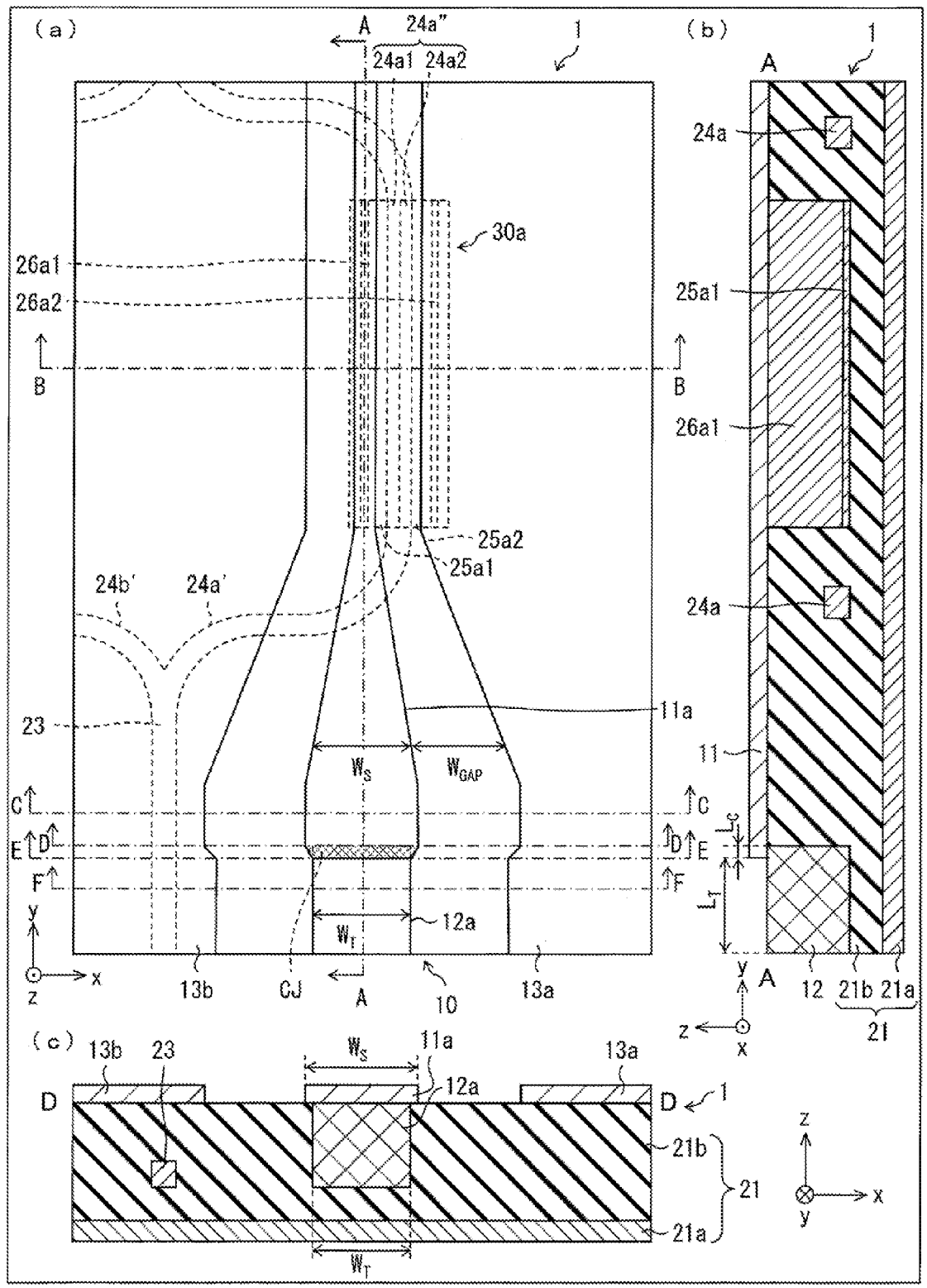

An optical modulator including a high-frequency circuit of Embodiment 1 of the present invention is described below with reference to FIGS. 1 and 2. FIG. 1 is a schematic view illustrating a configuration of a main part of an optical modulator 1 including a high-frequency circuit 10 of Embodiment 1. More specifically, (a) of FIG. 1 is a perspective view of the optical modulator 1, and (b) of FIG. 1 is a cross-sectional view, taken along the line L-L shown in (a) of FIG. 1, of a first optical modulating section 30*a* of the optical modulator 1. FIG. 2 is a diagram illustrating a configuration of a main part of the high-frequency circuit 10 of Embodiment 1. More specifically, (a) of FIG. 2 is a top view of the high-frequency circuit 10, (b) of FIG. 2 is a cross-sectional view of the high-frequency circuit 10 as taken along the line A-A shown in (a) of FIG. 2, and (c) of FIG. 2 is a cross-sectional view of the high-frequency circuit 10 as taken along the line D-D shown in (a) of FIG. 2.

(Configuration of the Optical Modulator 1)

The optical modulator 1 is an optical modulator that can be used for optical communication. The optical modulator 1 is a silicon optical modulator that modulates incoming light by applying a modulating electric field in accordance with a modulating signal to a silicon- (Si-) based p-n junction. As shown in FIGS. 1 and 2, the optical modulator 1 has a layered structure in which a semiconductor layer 21*a* and an insulator layer 21*b* are stacked in this order. The insulator layer 21*b* includes a first insulator layer 21*b*1 and a second insulator layer 21*b*2. The first insulator layer 21*b*1 and the second insulator layer 21*b*2 are hereinafter merely collectively called "insulator layer 21*b*" in a case where there is no need to distinguish between the first insulator layer 21*b*1 and the second insulator layer 21*b*2. Further, the semiconductor layer 21*a* and the insulator layer 21*b* are collectively called "substrate 21". As the substrate 21, it is possible to use a substrate for fabrication of the optical modulator 1, such as an SOI (silicon on insulator) substrate.

Note that a coordinate system illustrated in FIG. 1 is defined as follows: (1) The y-axis is an axis that is parallel to a direction in which a signal line 11a extends. The positive direction of the y-axis is defined as a direction from a junction segment CJ of the signal line 11a to the first optical modulating section 30a. (2) The z-axis is an axis that is parallel to a direction in which the thickness of the signal line 11a extends. The positive direction of the z-axis is defined as a direction from the semiconductor layer 21a to the insulator layer 21b in the substrate 21. (3) The x-axis is an axis that is parallel to a direction in which the width of the signal line 11a extends. A direction of the x-axis is set such that the x-axis, the y-axis, and the z-axis constitute a right-handed coordinate system.

As an optical waveguide constituting a Mach-Zehnder (M-Z) optical interferometer, an entrance waveguide 22, an exit waveguide 23, a first arm section 24a, and a second arm section 24b are provided inside the insulator layer 21b, i.e., sandwiched between the first insulator layer 21b1 and the second insulator layer 21b2. The first arm section 24a and the second arm section 24b branch from the entrance waveguide 22, extend along the y-axis, and then are combined into the exit waveguide 23. The first arm section 24a includes a waveguide section 24a' and a p-n junction 24a". The p-n junction 24a" is provided near the center of the first arm section 24a, and a portion of the first arm section 24a excluding the p-n junction 24a" serves as the waveguide section 24a'. The second arm section 24b includes a waveguide section 24b' and a p-n junction 24b" that are similar in configuration to the waveguide section 24a' and the p-n junction 24a". The entrance waveguide 22, the exit waveguide 23, the waveguide section 24a', and the waveguide section 24b' are each a rectangular waveguide whose cross-sectional shape is a rectangle.

The entrance waveguide 22, the exit waveguide 23, the waveguide section 24a', and the waveguide section 24b' are made of silicon, and the p-n junction 24a" and the p-n junction 24b" are silicon- (Si-) based. The entrance waveguide 22, the exit waveguide 23, the first arm section 24a, and the second arm section 24b, which are thus configured, serve as a core to allow propagation of light. This is because the entrance waveguide 22, the exit waveguide 23, the first arm section 24a, and the second arm section 24b are surrounded by the first insulator layer 21b1 and the second insulator layer 21b2, which are made of silicon dioxide ($SiO_2$). On the other hand, the first insulator layer 21b1 and the second insulator layer 21b2 serve as cladding to confine light within the core.

(Configuration of Optical Modulating Sections)

The first optical modulating section 30a is provided near the center of the first arm section 24a, and a second optical modulating section 30b is provided near the center of the second arm section 24b.

The first optical modulating section 30a includes the first arm section 24a, a slab 25a1, a slab 25a2, a traveling-wave electrode 26a1, a traveling-wave electrode 26a2, the signal line 11a, and a first ground line 13a.

As illustrated in (b) of FIG. 1 and (a) of FIG. 2, the p-n junction 24a" of the first arm section 24a includes a p-type silicon waveguide 24a1 and an n-type silicon waveguide 24a2. The p-type silicon waveguide 24a1 is made of p-type silicon, i.e., acceptor doped silicon, and the n-type silicon waveguide 24a2 is made of n-type silicon, i.e., donor doped silicon. The p-type silicon waveguide 24a1 and the n-type silicon waveguide 24a2 have junction surfaces that are parallel to the y-z plane, and are in contact with each other at the junction surfaces. Therefore, the p-n junction 24a" is a lateral p-n junction in which a direction of flow of a carrier across the p-n junction and a direction of flow of light through the waveguide cross each other.

Assuming that the positive direction of the z-axis is an upward direction and the negative direction of the z-axis is a downward direction, the slab 25a1, which projects in the negative direction of the x-axis, is provided in a lowest part of the p-type silicon waveguide 24a1 and the slab 25a2, which projects in the positive direction of the x-axis, is provided in a lowest part of the n-type silicon waveguide 24a2. The length along the y-axis of each of the slabs 25a1 and 25a2 is nearly equal to the length along the y-axis of the p-n junction 24a". Therefore, a waveguide of the first optical modulating section 30a is a rib-type waveguide including a thick rib (p-n junction 24a") in a central part and thin slabs (25a1 and 25a2) at both ends. Note that the slab 25a1 is made of p-type silicon, as with the p-type silicon waveguide 24a1, and the slab 25a2 is made of n-type silicon, as with the n-type silicon waveguide 24a2.

The signal line 11a, which is parallel to the y-axis and extends from the light entrance side to the light exit side of the optical modulator 1, is provided in such a position above an upper surface of the first insulator layer 21b1 as to face the slab 25a1. Similarly, the first ground line 13a, which is parallel to the y-axis and extends from the light entrance side to the light exit side of the optical modulator 1 is provided in such a position above the upper surface of the first insulator layer 21b1 as to face the slab 25a2.

The slab 25a1 is connected to the signal line 11a via the traveling-wave electrode 26a1, which rises from an upper surface of the slab 25a1 in the positive direction of the z-axis. Similarly, the slab 25a2 is connected to the first ground line 13a via the traveling-wave electrode 26a2. The traveling-wave electrodes 26a1 and 26a2 each have a flat shape that is upright in parallel with the y-z plane and that is thinner than the width of the signal line 11a and the width of the first ground line 13a. Further, the length along the y-axis of each of the traveling-wave electrodes 26a1 and 26a2 is nearly equal to the length along the y-axis of the p-n junction 24a". The traveling-wave electrodes 26a1 and 26a2 are both made of aluminum (Al). In a case where modulating signals are inputted to the traveling-wave electrodes 26a1 and 26a2, a modulating electric field in accordance with a value of the modulating signals is applied to the p-n junction 24a. Use of the traveling-wave electrodes 26a1 and 26a2 as electrodes allows a direction of propagation of the modulating signals through the electrodes and a direction of propagation of light through the p-n junction 24a" to be matched to each other. This allows a smaller difference between the propagation of the modulating signals through the traveling-wave electrodes 26a1 and 26a2 and the propagation of light through the p-n junction 24a", so that the optical signal to be modulated can have a wider bandwidth.

The signal line 11a and the first ground line 13a serve as a circuit line pattern made of aluminum and provided on an upper surface of the insulator layer 21b. The signal line 11a has a first end (i.e. an end facing in the positive direction of the y-axis) connected to a pulse pattern generator (PPG) (not illustrated) and a second end (i.e. an end facing in the negative direction of the y-axis) connected to the termination resistor 12a. The first ground line 13a is grounded, and is connected to the termination resistor 12a via a capacitor by a circuit line (not illustrated). Note that a shape of the signal line 11a and a mode of connection between the signal line 11a and the termination resistor 12a will be described later with reference to FIG. 2.

As shown in (a) through (c) of FIG. 2, the termination resistor 12a includes a resistive element formed in an outer layer of the insulator layer 21b of the substrate 21 so that an upper surface of the termination resistor 12a is exposed on the outer layer, and is provided so as to suppress the reflection, at the second end of the signal line 11a, of a modulating signal inputted from the first end of the signal line 11a. The termination resistor 12a may be made of (i) a conductive compound such as titanium nitride (TiN), (ii) a p-type semiconductor, i.e, a semiconductor made of acceptor doped silicon, or (iii) an n-type semiconductor, i.e, a semiconductor made of donor doped silicon.

The second optical modulating section 30b is similar in configuration to the first optical modulating section 30a. Specifically, the p-n junction 24b" of the second arm section 24b constituting the second optical modulating section 30b is a p-n junction including the p-type silicon waveguide 24a1 and the n-type silicon waveguide 24a2. The p-type silicon waveguide 24a1 is connected to a signal line 11b via the traveling-wave electrode 26a1 and the slab 25a1 made of p-type silicon. The n-type silicon waveguide 24a2 is connected to a second ground line 13b via the traveling-wave electrode 26a2 and the slab 25a2 made of n-type silicon. Note that a third ground line (not illustrated) is provided at a side of the signal line 11b opposite to a side at which the second ground line 13b is provided.

The signal line 11b, the second ground line 13b, and the third ground line serve as a circuit line pattern made of aluminum (Al) and provided on the upper surface of the insulator layer 21b. The signal line 11b has a first end (i.e. an end facing in the positive direction of the y-axis) connected to the PPG (not illustrated) and a second end (i.e. an end facing in the negative direction of the y-axis) connected to a termination resistor 12b. The second ground line 13b and the third ground line are grounded, and are connected to the termination resistor 12b via a capacitor by a circuit line (not illustrated).

The M-Z optical interferometer of the optical modulator 1 has been described assuming that the first arm section 24a and the second arm section 24b are each provided with an optical modulating section. However, the optical modulator 1 may be configured such that either the first arm section 24a or the second arm section 24b is provided with an optical modulating section.

(High-Frequency Circuit 10)

The high-frequency circuit 10 of Embodiment 1 includes the signal line 11a, the termination resistor 12a, the first ground line 13a, and the second ground line 13b. Similarly, the signal line 11b, the termination resistor 12b, the second ground line 13b, and the third ground line constitute a high-frequency circuit of Embodiment 1. The high-frequency circuit 10 of Embodiment 1 is described below with reference to FIGS. 2 and 3.

Figure 3:
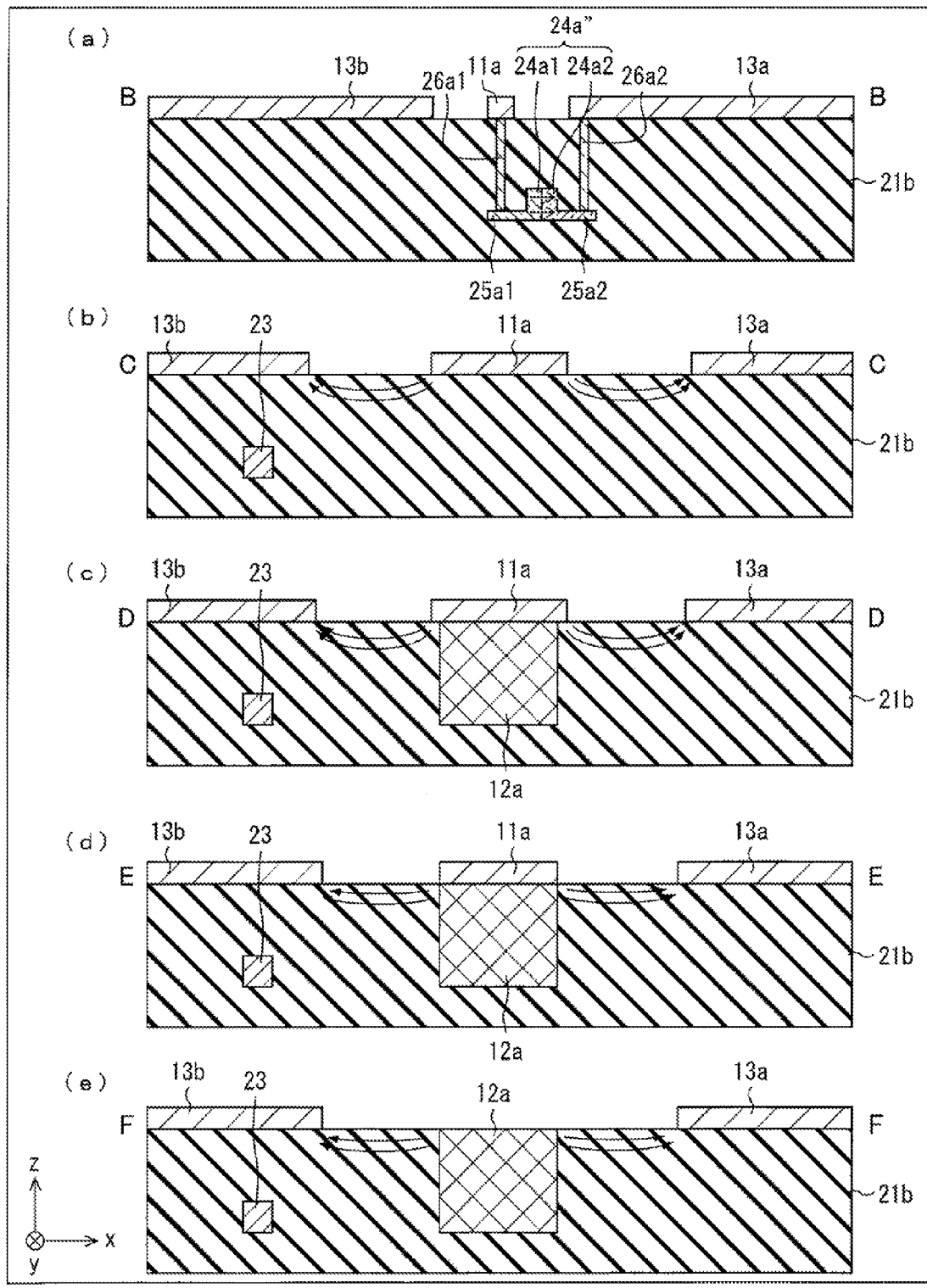

(a) of FIG. 2 is a top view of the high-frequency circuit 10, (b) of FIG. 2 is a cross-sectional view of the high-frequency circuit 10 as taken along a line A-A shown in (a) of FIG. 2, and (c) of FIG. 2 is a cross-sectional view of the high-frequency circuit 10 as taken along a line D-D shown in (a) of FIG. 2. FIG. 3 is a cross-sectional view of the high-frequency circuit 10 as taken along a line B-B shown in (a) of FIG. 2, (b) of FIG. 3 is a cross-sectional view of the high-frequency circuit 10 as taken along a line C-C shown in (a) of FIG. 2, (c) of FIG. 3 is a cross-sectional view of the high-frequency circuit 10 as taken along a line D-D shown in (a) of FIG. 2, (d) of FIG. 3 is a cross-sectional view of the high-frequency circuit 10 as taken along a line E-E shown in (a) of FIG. 2, and (e) of FIG. 3 is a cross-sectional view of the high-frequency circuit 10 as taken along a line F-F shown in (a) of FIG. 2.

As shown in (a) of FIG. 2, the signal line 11a extends in a direction parallel to the y-axis, and is connected to the termination resistor 12a at an end (a termination point) of the signal line 11a that faces in the negative direction of the y-axis. As shown in (b) and (c) of FIG. 2, the termination resistor 12a is embedded to the surface of the substrate 21 so that an upper surface of the termination resistor 12a is flush with an upper surface of the substrate 21. Let it be assumed here that the junction segment CJ of the signal line 11a starts at a position (which serves as a starting position, i.e. a position represented by the line D-D in (a) of FIG. 2) short of the termination point of the signal line 11a on the surface of the substrate 21 and ends at the termination point (which serves as an end position, i.e. a position represented by the line E-E in (a) of FIG. 2). The junction segment CJ covers a portion of the upper surface of the termination resistor 12a, whereby the junction segment CJ is connected to the termination resistor 12a from the start position to the end position. As will be described later, the width of the signal line 11a at the start position is greater than the width of the upper surface of the termination resistor 12a at the start position. This means that a portion along the width of the junction segment CJ of the signal line 11a that extends from the start position to the end position is connected to the termination resistor 12a. Note that the width of the junction segment CJ extends in the same direction as the width of the signal line 11a.

Let it be assumed hereinafter that the width $W_S$ is the length along the x-axis of the signal line 11a and that the width $W_T$ is the length along the x-axis of the upper surface of the termination resistor 12a. The width $W_T$ is constant, e.g. 50 µm, regardless of a position on the y-axis. In contrast, the width $W_S$ is not constant but gradually changes along the y-axis. In the first optical modulating section 30a, the width $W_S$ is several micrometers. Therefore, at a connection between the signal line 11a and the traveling-wave electrode 26a1, the width $W_S$ is obviously smaller than the width $W_T$.

On the other hand, as shown in (c) of FIG. 2, the width $W_S$ of the signal line 11a connected to the upper surface of the termination resistor 12a is greater than the width $W_T$ at the start position (i.e. a first side edge of the termination resistor 12a; a side edge facing in the positive direction of the y-axis) of the junction segment CJ. That is, the signal line 11a has such a taper shape that the width $W_S$ gradually increases from the first optical modulating section 30a toward the termination resistor 12a. This allows suppression of an abrupt change in impedance of the signal line 11a.

(a) of FIG. 3 illustrates lines of electric force representing an electric field that is generated in the first optical modulating section 30a when a positive voltage is applied to the signal line 11a. The lines of electric force are generated inside the p-n junction 24a" and in a direction from the p-type silicon waveguide 24a1 toward the n-type silicon waveguide 24a2.

(b) of FIG. 3 illustrates lines of electric force representing an electric field that is generated, when a positive voltage is applied to the signal line 11a, in a region near the junction segment CJ of the signal line 11a and near a side facing in the positive direction of the y-axis. The lines of electric force are distributed in a region having a higher dielectric constant. In Embodiment 1, the dielectric constant of the insulator layer 21b is higher than the atmospheric dielectric constant, and thus the lines of electric force generated around the signal line 11a are distributed through the insulator layer 21b, not through the atmosphere. Specifically, the lines of electric force are generated and distributed inside the insulator layer 21b in a direction from an end of the signal line 11a that faces in the positive direction of the x-axis toward an end of the first ground line 13a that faces in the negative direction of the x-axis and in a direction from an end of the signal line 11a that faces in the negative direction of the x-axis toward an end of the second ground line 13b that faces in the positive direction of the x-axis. The end of the signal line 11a that faces in the positive direction of the x-axis, the end of the signal line 11a that faces in the negative direction of the x-axis, the end of the first ground line 13a that faces in the negative direction of the x-axis, and the end of the second ground line 13b that faces in the positive direction of the x-axis are places where electric fields concentrate. Starting and ending points of the lines of electric force are distributed in these places where electric fields concentrate. The signal line 11a is shaped so that the width $W_S$ gradually increases from the first optical modulating section 30a toward the junction segment CJ.

Further, the ratio of a gap WGAP (see (a) of FIG. 2) between the signal line 11a and the first ground line 13a to the width $W_S$ and the ratio of a gap between the signal line 11a and the second ground line 13b to the width $W_S$ are each preferably constant from the first optical modulating section 30a to the termination resistor 12a. In other words, the first ground line 13a and the second ground line 13b are preferably shaped and arranged such that the impedance of the signal line 11a as viewed from the ground lines 13a and 13b is kept at a constant value and loss and reflection of a modulating signal through the signal line 11a are suppressed.

For these reasons, no abrupt change occurs in the lines of electric force in a segment from the first optical modulating section 30a to the junction segment CJ.

(c) of FIG. 3 illustrates lines of electric force representing an electric field that is generated at the start position of the junction segment CJ when a positive voltage is applied to the signal line 11a. At the start position of the junction segment CJ, the termination resistor 12a below the signal line 11a exists as a discontinuous structure along the y-axis with respect to the signal line 11a. However, since the width $W_S$ of the signal line 11a at the start position of the junction segment CJ is greater than the width $W_T$, right and left ends (i.e. an end facing in the positive direction of the x-axis and an end facing in the negative direction of the x-axis) of the signal line 11a are provided on the insulator layer 21b, not on the termination resistor 12a.

According to the configuration, many of the electric fields continue to concentrate at the right and left ends of the signal line 11a, while electric fields are also generated at a side surface of the termination resistor 12a that faces in the positive direction of the x-axis and a side surface of the termination resistor 12a that faces in the negative direction of the x-axis. Accordingly, many of the lines of electric force continue to be distributed in a concentrated way at the right and left ends of the signal line 11a, while some of the starting points of the lines of electric force are also distributed on the side surfaces of the termination resistor 12a. Specifically, the lines of electric force from the signal line 11a toward the first ground line 13a and the lines of electric force from the signal line 11a toward the second ground line 13b do not abruptly change through the start position of the junction segment CJ. As a result, the high-frequency circuit 10 can suppress an influence of the termination resistor 12a, which is different in dielectric constant from the surrounding insulator layer 21b, on the lines of electric force at the start position of the junction segment CJ between the signal line 11a and the termination resistor 12a, though the termination resistor 12a which is formed in the surface of the substrate 21, the signal line 11a, the first ground line 13a, and the second ground line 13b are not coplanarly arranged. In other words, the high-frequency circuit 10 can suppress an impedance mismatch between the signal line 11a and the termination resistor 12a at the start position of the junction section CJ and can suppress the reflection of a modulating signal which reflection can occur at the start position of the junction segment CJ.

The width $W_S$ of the signal line 11a preferably gradually decreases from the start position of the junction segment CJ toward the end position of the junction segment CJ and is preferably equal to the width $W_T$ of the upper surface of the termination resistor 12a at the end position of the junction segment CJ. In other words, the signal line 11a as viewed from above in the junction segment CJ of the signal line 11a preferably has such a taper shape that the width $W_S$ gradually decreases from the start position toward the end position.

(d) of FIG. 3 illustrates lines of electric force representing an electric field that is generated, when a positive voltage is applied to the signal line 11a, at the end of the signal line 11a that faces in the negative direction of the y-axis, i.e. at the end position of the junction segment CJ. The continuous change in width $W_S$ of the junction segment CJ leads to a continuous change in lines of electric force in the junction segment CJ. The above configuration can further suppress an impedance mismatch between the signal line 11a and the termination resistor 12a at the end position of the junction segment CJ of the signal line 11a, as compared with a case where the width $W_S$ of the signal line 11a at the end position of the junction segment CJ of the signal line 11a is greater than the width $W_T$.

Note that Embodiment 1 has been described assuming that the width $W_S$ of the signal line 11a at the end position is configured to be equal to the width $W_T$. However, the width $W_S$ of the signal line 11a at the end position is not limited to this configuration, and may be equal to or less than the width $W_T$.

(e) of FIG. 3 illustrates lines of electric force of an electric field that is generated when a positive voltage is applied to the termination resistor 12a, i.e. in the region where the signal line 11a is absent. Such lines of electric force that is generated in the region where the signal line 11a is absent is similar to the lines of electric force at the end of the signal line 11a illustrated in (d) of FIG. 3.

As described above, the high-frequency circuit 10 causes no abrupt change in lines of electric force in the junction segment CJ between the signal line 11a and the termination resistor 12a and a region near the junction segment CJ. Therefore, the high-frequency circuit 10 can suppress the reflection of a modulating signal that is a high-frequency signal inputted to the signal line 11a.

Note that the termination resistor 12a is sized to have a predetermined resistance value. The predetermined resistance value is a resistance value that is determined so that the impedance of the signal line 11a and the impedance of the termination resistor 12a are matched to each other. The predetermined resistance value is for example 50Ω. (1) Titanium nitride or (2) a dopant doped semiconductor is larger in resistivity than aluminum of which the signal line 11a, the first ground line 13a, and the second ground line 13b are made. Therefore, in a case where the termination resistor 12a, which has a resistance value of about 50Ω, is made of (1) titanium nitride or (2) a dopant doped semiconductor, a cross-sectional area of the termination resistor 12a in the z-x plane is larger than a cross-sectional area of the signal line 11a in the z-x plane. The width $W_T$ of the termination resistor 12a is typically about 50 μm, because the second insulator layer 21b2 has a finite thickness.

A reduction in the cross-sectional area of the termination resistor 12a in the z-x plane and a reduction in the length $L_T$ (see (b) of FIG. 2) along the y-axis of the termination resistor 12a allow a resistive element whose area as viewed from above has been reduced to be used as the termination resistor 12a. However, use of a small resistive element as the termination resistor 12a causes an area error of the termination resistor 12a, an area error of the junction segment CJ, etc. to greatly influence the resistance value of the termination resistor 12a.

Further, use of the small resistive element as the termination resistor 12a causes an increase in the ratio of the area of the junction region to the area of the upper surface of the termination resistor 12a. Note that the junction region here means a region of the junction segment CJ in which region the junction segment CJ is joined to the termination resistor 12a. The increase in the ratio of the area of the junction region to the area of the upper surface of the termination resistor 12a means that a large part of the termination resistor 12a is located below the signal line 11a and that there is a larger divergence from an ideal coplanar arrangement. Thus, a reduction in size of the termination resistor 12a makes it difficult to match the impedance of the signal line 11a and the impedance of the termination resistor 12a to each other.

Furthermore, use of the small resistive element as the termination resistor 12a may cause electric power of the modulating signal to be converted into heat at the small termination resistor 12a, and this conversion may cause problems such as an increase in heating value per unit volume of the termination resistor 12a, an increase in maximum temperature of the termination resistor 12a, and an increase in heat gradient around the termination resistor 12a.

From these points of view, it is not preferable to reduce the size of the termination resistor 12a too much. It is empirically preferable that the termination resistor 12a be sized so that the width $W_T$ is about 50 μm and the length $L_T$ is about 100 μm.

From the point of view of reducing the size of the high-frequency circuit, it is not preferable that the junction region be designed to be unnecessarily larger than the termination resistor 12a thus sized. In contrast, the junction region having a too small area may cause contact resistance between the signal line 11a and the termination resistor 12a. Therefore, the area of the junction region needs only be designed to be as small as possible insofar as the contact resistance is small to such an extent that no practical problem occurs.

A preferable ratio of the area of the junction region to the area of the upper surface of the termination resistor 12a as based on the design guide described above is 1% or higher and 10% or lower. The ratio that is 1% or higher allows a sufficient reduction in contact resistance between the signal line 11a and the termination resistor 12a. On the other hand, the ratio that is 10% or lower makes it easy to match the impedance of the signal line 11a and the impedance of the termination resistor 12a to each other and makes it unnecessary to make the high-frequency circuit 10 unnecessarily large.

In a case where the upper surface of the termination resistor 12a has a rectangular shape and the width $W_T$ is constant, the ratio of the area of the junction region to the area of the upper surface of the termination resistor 12a can also be expressed as the ratio of the length $L_C$ along the y-axis of the junction region (junction segment CJ) to the length $L_T$ along the y-axis of the termination resistor 12a. In this case, it can be said to be preferable that the ratio of the length $L_C$ to the length $L_T$ be 1% or higher and 10% or lower.

(Operation of the Optical Modulator 1)

The operation of the optical modulator 1, which is a silicon optical modulator, is briefly described below with reference to FIG. 1. Light having entered through the entrance waveguide 22 branches into two beams of light that propagate through the first arm section 24a and the second arm section 24b, respectively.

The beam of light that propagates through the first arm section 24a is modulated at the p-n junction 24a" of the first optical modulating section 30a. Specifically, a modulating electric field is applied to the p-n junction 24a" of the first optical modulating section 30a in accordance with a modulating signal inputted from the PPG to the signal line 11a. The modulating electric field thus applied causes a change in free carrier concentration at the p-n junction 24a", thereby causing a change in refractive index of the p-n junction 24a". This change in refractive index due to the modulating electric field is used to allow the first optical modulating section 30a to modulate the beam of light that propagates through the p-n junction 24a".

Similarly, the beam of light that propagates through the second arm section 24b is modulated by the second optical modulating section 30b. The two beams of light, which are thus modulated by the first optical modulating section 30a and the second optical modulating section 30b, respectively, are combined at the exit waveguide 23. The optical modulator 1 modulates the incoming light with a modulating signal by controlling the phase of the M-Z optical interferometer, and outputs the optical signal thus obtained.

COMPARATIVE EXAMPLE

Figure 9:
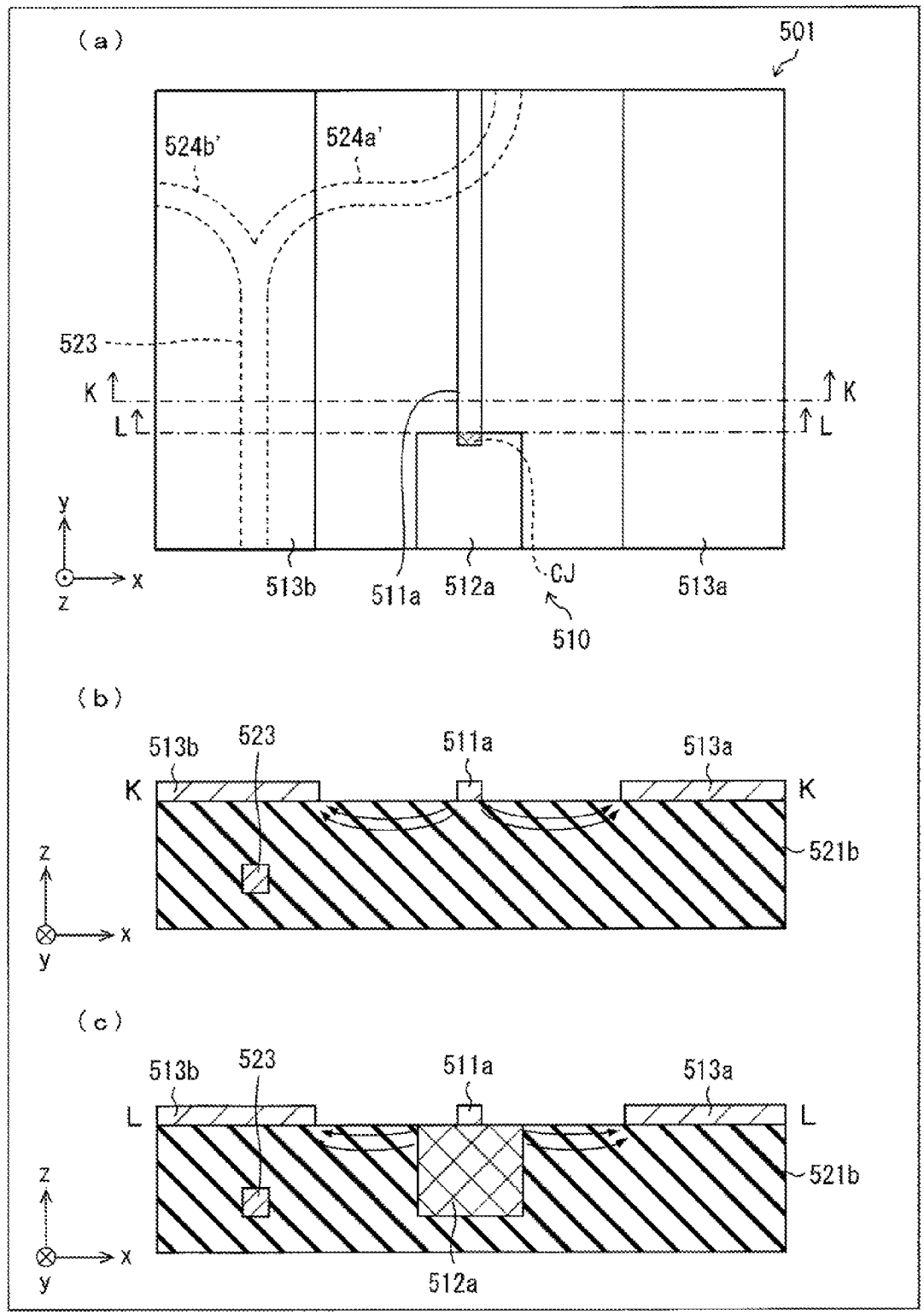
FIG. 9 is a top view of a high-frequency circuit of a comparative example of Embodiment 1 of the present invention.

A comparative example of the high-frequency circuit 10 of Embodiment 1 is described below with reference to FIG. 9. An optical modulator 501 of the comparative example includes a high-frequency circuit 510 of the comparative example. (a) of FIG. 9 is a top view of the high-frequency circuit 510 of the comparative example. (b) of FIG. 9 is a cross-sectional view of the high-frequency circuit 510 as taken along the line K-K shown in (a) of FIG. 9. (c) of FIG. 9 is a cross-sectional view of the high-frequency circuit 510 as taken along the line L-L shown in (a) of FIG. 9.

The optical modulator 501 of the comparative example is obtained by replacing the high-frequency circuit 10 of the optical modulator 1 of Embodiment 1 with the high-frequency circuit 510 of the comparative example. As illustrated in (a) of FIG. 9, the high-frequency circuit 510 includes a signal line 511a, a termination resistor 512a, a first ground line 513a, and a second ground line 513b.

The signal line 511a extends in a direction parallel to the y-axis, and is connected via the junction segment CJ covering a portion of the upper surface of the termination resistor 512a to the termination resistor 512a at an end of the signal line 511a that faces in the negative direction of the y-axis. The width $W_S$, which is the length along the x-axis of the signal line 511a, is constant from the first optical modulating section of the optical modulator 501 to the end. Thus, the high-frequency circuit 510 is configured such that the width $W_S$ of the signal line 511a at the boundary between the termination resistor 512a and the insulator layer 521b is smaller than the width $W_T$ along the x-axis of the termination resistor 512a.

(b) of FIG. 9 illustrates lines of electric force representing an electric field that is generated near the start position facing in the positive direction of the y-axis (i.e. a first side edge of the termination resistor 512; a side edge facing in the positive direction of the y-axis) of the junction segment CJ when a positive voltage is applied to the signal line 511a. The lines of electric force are generated in a direction from both ends of the signal line 511a toward the first ground line 513a and the second ground line 513b, respectively.

(c) of FIG. 9 illustrates lines of electric force representing an electric field generated at the start position of the junction segment CJ when a positive voltage is applied to the signal line 511a. At the start position of the junction segment CJ, the termination resistor 512a below the signal line 511a exists as a discontinuous structure along the y-axis with respect to the signal line 511a. At the start position of the junction segment CJ, at which position the width $W_S$ of the signal line 511a is smaller than the width $W_T$, the lines of electric force are generated in a direction from both side surfaces of the termination resistor 512a toward the first ground line 513a and the second ground line 513b, respectively.

Therefore, at the start position of the junction segment CJ, there is an abrupt change in shape of the lines of electric force generated between the signal line 511a and the first and second ground lines 513a and 513b. The abrupt change in shape of the lines of electric force causes an impedance mismatch between the signal line 511a and the termination resistor 512a. As a result, a portion of the modulating signal inputted to the signal line 511a is reflected at the start position of the junction segment CJ to return to the first optical modulating section. As a result, the modulating signal inputted from the PPG and propagated from the positive direction of the y-axis and the modulating signal reflected at the start position of the junction segment CJ and propagated from the negative direction of the y-axis are superimposed on each other in the first optical modulating section. As just described, the first optical modulating section of the optical modulator 501 of the comparative example may be unable to correctly modulate light.

Modification 1

Figure 4:
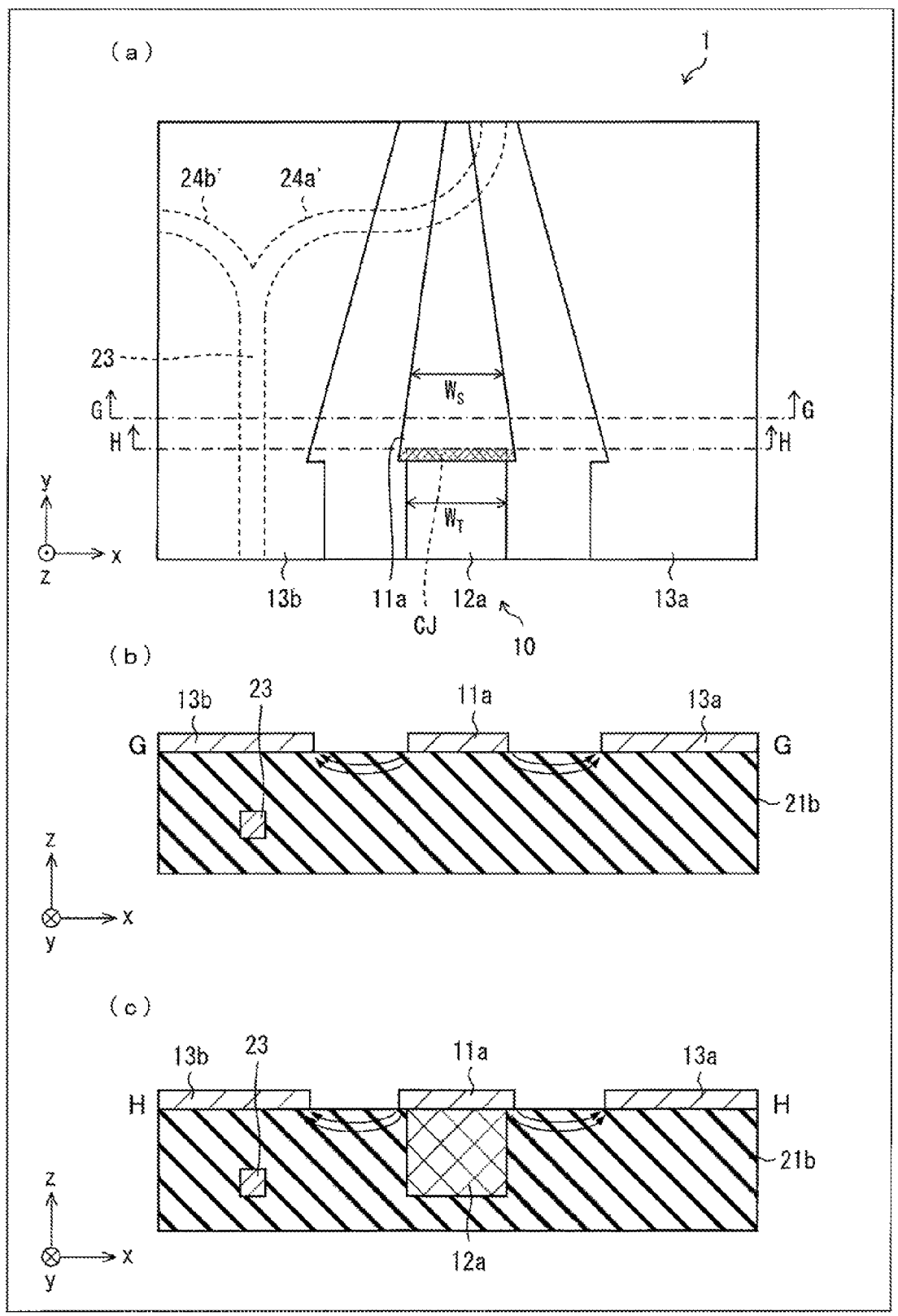

Modification 1 of the high-frequency circuit 10 of Embodiment 1 is described below with reference to FIG. 4. The high-frequency circuit 10 of Modification 1 is obtained by changing the shape of an end of the signal line 11a of the high-frequency circuit of Embodiment 1. (a) of FIG. 4 is a top view of the high-frequency circuit 10 of Modification 1. (b) of FIG. 4 is a cross-sectional view of the high-frequency circuit 10 as taken along the line G-G shown in (a) of FIG. 4. (c) of FIG. 4 is a cross-sectional view of the high-frequency circuit 10 as taken along the line H-H shown in (a) of FIG. 4.

As shown in (a) of FIG. 4, at the start position of the junction segment CJ, the width $W_S$ of the signal line 11a of the high-frequency circuit 10 of Modification 1 is greater than the width $W_T$ of the termination resistor 12a. Further, also at the end position of the junction segment CJ (i.e. an end of the signal line 11a; a side edge facing in the negative direction of the y-axis), the width $W_S$ is greater than the width $W_T$. Therefore, a portion along the width of the junction segment CJ of the signal line 11a that extends from the start position to the end position is connected to the termination resistor 12a.

(b) of FIG. 4 illustrates lines of electric force representing an electric field that is generated, when a positive voltage is applied to the signal line 11a, in a region near the start position of the junction segment CJ of the signal line 11a and near a side facing in the positive direction of the y-axis. The lines of electric force are generated in a direction from both ends of the signal line 11a toward the first ground line 13a and the second ground line 13b, respectively.

(c) of FIG. 4 illustrates lines of electric force representing an electric field that is generated at the start position of the junction segment CJ when a positive voltage is applied to the signal line 11a. At the start position of the junction segment CJ, the termination resistor 12a below the signal line 11a exists as a discontinuous structure along the y-axis with respect to the signal line 11a. However, since the width $W_S$ of the signal line 11a at the start position of the junction segment CZ is greater than the width $W_T$, the ends of the lines of electric force remain concentrated at both ends of the signal line 11a. Therefore, the lines of electric force from the signal line 11a toward the first ground line 13a and the lines of electric force from the signal line 11a toward the second ground line 13b do not abruptly change even at a boundary between the signal line 11a and the termination resistor 12a. For this reason, as with the high-frequency circuit 10 of Embodiment 1, the high-frequency circuit 10 of Modification 1 can suppress an impedance mismatch between the signal line 11a and the termination resistor 12a at the start position of the junction segment CJ and the reflection of the modulating signal at the boundary.

Modification 2

Figure 5:
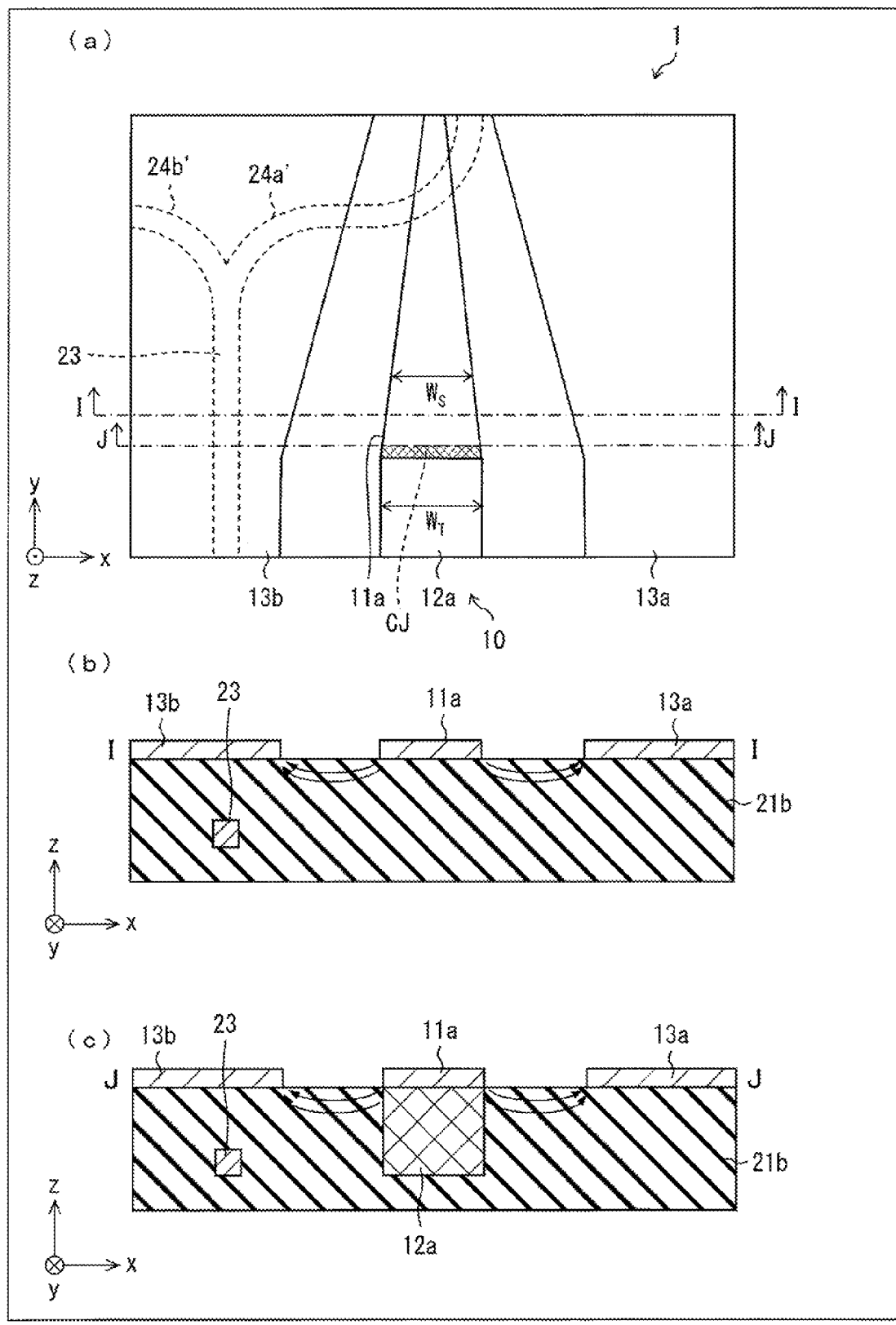

Modification 2 of the high-frequency circuit 10 of Embodiment 1 is described below with reference to FIG. 5. The high-frequency circuit 10 of Modification 2 is obtained by changing the shape of an end (i.e. an end facing the negative direction of the y-axis) of the signal line 11a of the high-frequency circuit of Embodiment 1. (a) of FIG. 5 is a top view of the high-frequency circuit 10 of Modification 2. (b) of FIG. 5 is a cross-sectional view of the high-frequency circuit 10 as taken along the line I-I shown in (a) of FIG. 5. (c) of FIG. 5 is a cross-sectional view of the high-frequency circuit 10 as taken along the line J-J shown in (a) of FIG. 5.

As shown in (a) of FIG. 5, at the start position (i.e. a first side edge of the termination resistor 12a; a side edge facing in the positive direction of the y-axis) of the junction segment CJ, the width $W_S$ of the signal line 11a of the high-frequency circuit 10 of Modification 2 is equal to the width $W_T$ of the termination resistor 12a. Further, also at the end position of the junction segment CJ (i.e. an end of the signal line 11a; a side edge facing in the negative direction of the y-axis), the width $W_S$ is equal to the width $W_T$. That is, the width $W_S$ in the junction segment CJ is equal to the width $W_T$. Therefore, the signal line 11a is connected to the termination resistor 12a from the start position to the end position across the whole width of the junction segment CJ.

(b) of FIG. 5 illustrates lines of electric force representing an electric field that is generated, when a positive voltage is applied to the signal line 11a, in a region near the start position of the junction segment CJ of the signal line 11a and near a side facing in the positive direction of the y-axis. The lines of electric force are generated in a direction from both ends of the signal line 11a toward the first ground line 13a and the second ground line 13b, respectively.

Next, (c) of FIG. 5 illustrates lines of electric force representing an electric field that is generated at the start position of the junction segment CJ when a positive voltage is applied to the signal line 11a. At the start position of the junction segment CJ, the termination resistor 12a below the signal line 11a exists as a discontinuous structure along the y-axis with respect to the signal line 11a. As compared with the lines of electric force in the high-frequency circuit 10 of Modification 1 illustrated in (c) of FIG. 4, the lines of electric force in the high-frequency circuit 10 of Modification 2 are further broadened in shape to some extent in a direction in which the thickness of the termination resistor 12a extends (i.e. the negative direction of the z-axis). However, the width $W_S$ being equal to the width $W_T$ at the start position of the junction segment CJ suppresses broadening of the lines of electric force in the direction in which the thickness of the termination resistor 12a extends.

Therefore, the lines of electric force from the signal line 11a toward the first ground line 13a and the lines of electric force from the signal line 11a toward the second ground line 13b do not abruptly change at the start position of the junction segment CJ. For this reason, as compared with the high-frequency circuit 510 of the comparative example, the high-frequency circuit 10 of Modification 2 can further suppress an impedance mismatch between the signal line 11a and the termination resistor 12a at the start position of the junction segment CJ and the reflection of the modulating signal at the boundary.

Further Modifications

Further modifications of the high-frequency circuit 10 of Embodiment 1 are described below with reference to FIG. 6. The high-frequency circuit 10 of Embodiment 1 has been described assuming that the width $W_S$ along the x-axis of the signal line 11a of the first optical modulating section 30a is smaller than the width $W_T$ along the x-axis of the termination resistor 12a. However, the high-frequency circuit 10 is not limited by a magnitude relationship between the width $W_S$ in the first optical modulating section 30a and the width $W_T$. In other words, a configuration in which the width $W_S$ in the first optical modulating section 30a is greater than the width $W_T$ at the start position of the junction segment CJ is also encompassed in the technical scope of the present invention.

Figure 6:
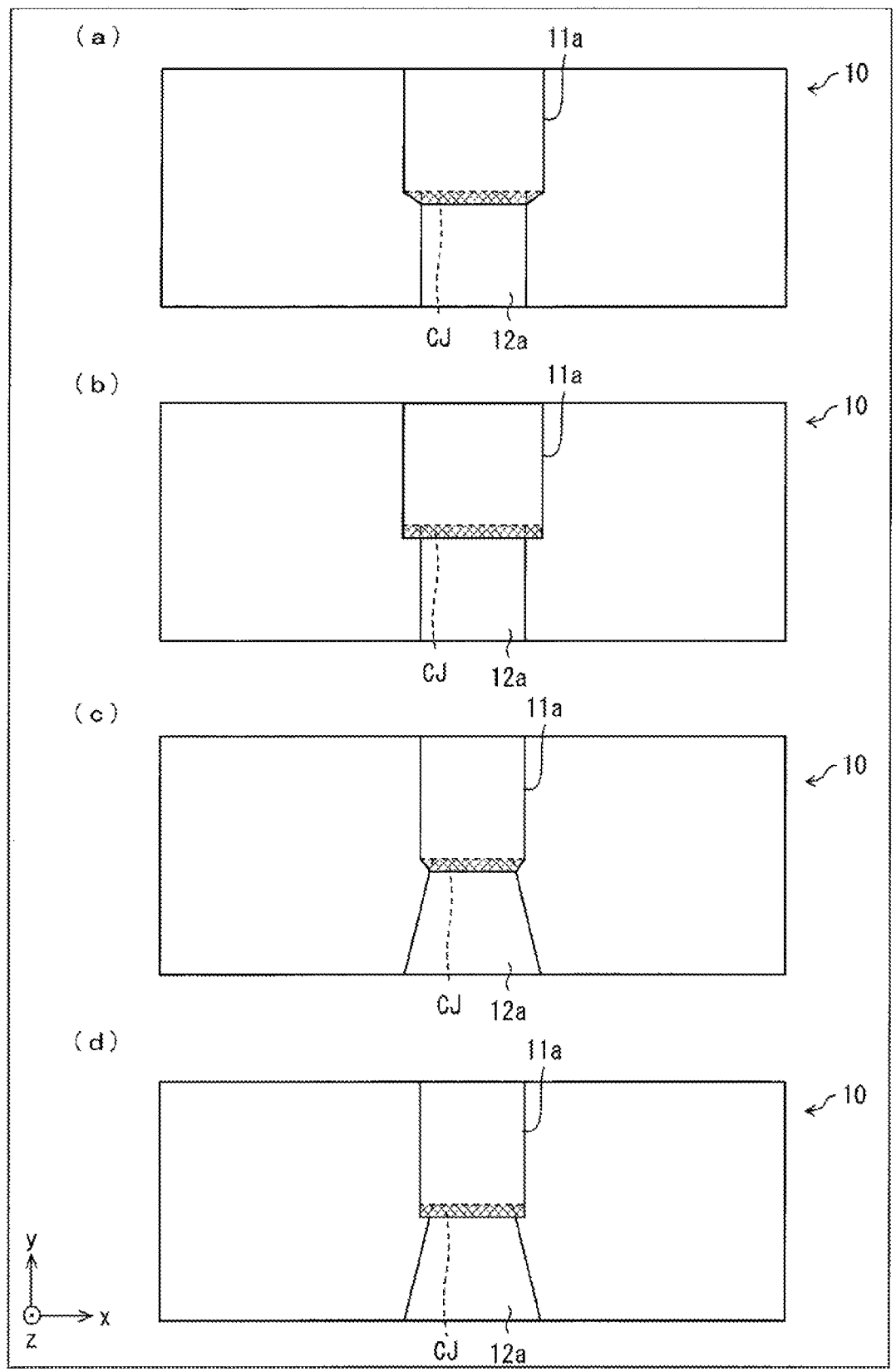

(a) through (d) of FIG. 6 are top views of further modifications of high-frequency circuits 10. In each of the further modifications, the width $W_S$ is constant from the first optical modulating section 30a to the connection between the signal line 11a and the termination resistor 12a, and is greater than the width $W_T$ at the start position of the junction segment CJ. (a) through (d) of FIG. 6 are each an enlarged view of the connection between the signal line 11a and the termination resistor 12a and an area therearound. Note that (a) through (d) of FIG. 6 do not illustrate the first ground line 13a and the second ground line 13b.

As illustrated in (a) of FIG. 6, a high-frequency circuit 10 of an example of a further modification is configured such that the width $W_S$ of the signal line 11a at the start position of the junction segment CJ is greater than the width $W_T$ and that the width $W_S$ of the signal line 11a at the end position of the junction segment CJ is equal to the width $W_T$.

As illustrated in (b) of FIG. 6, a high-frequency circuit 10 of an example of a further modification is obtained by altering the high-frequency circuit 10 illustrated in (a) FIG. 6 such that the width $W_S$ of the signal line 11a at the end position of the junction segment CJ is greater than the width $W_T$.

As illustrated in (c) of FIG. 6, a high-frequency circuit 10 of an example of a further modification is configured such that the termination resistor 12a has a shape of a trapezoid as viewed from above. A second end (i.e. an end facing in the negative direction of the y-axis) of the signal line 11a is connected to the termination resistor 12a via the junction segment CJ covering a portion of the upper surface, such as a short base (i.e. a base facing in the positive direction of the y-axis) of the termination resistor 12a. In this case, the width $W_S$ of the signal line 11a at the start position of the junction segment CJ is greater than the width $W_T$, and the width $W_S$ of the signal line 11a at the end position of the junction segment CJ is equal to the width $W_T$.

As illustrated in (d) of FIG. 6, a high-frequency circuit 10 of an example of a further modification is obtained by altering the high-frequency circuit 10 illustrated in (c) of FIG. 6 such that the width $W_S$ of the signal line 11a at the end position of the junction segment CJ is greater than the width $W_T$.

The high-frequency circuits 10 of the further modifications illustrated in (a) through (d) of FIG. 6 are each configured such that the width $W_S$ of the signal line 11a at the start position of the junction segment CJ is greater than the width $W_T$. According to these configurations, the lines of electric force generated between the signal line 11a and each of the ground lines 13a and 13b do not abruptly change at the start position of the junction segment CJ. Thus, it is possible to prevent impedance mismatching between the signal line 11a and the termination resistor 12a, and suppress the reflection of the modulating signal which reflection can occur at the start position of the junction segment CJ.

The high-frequency circuit 10 is more preferably configured such that the width $W_S$ and the width $W_T$ are equal to each other at the end position of the junction segment CJ as illustrated in (a) and (c) of FIG. 6. These configurations can further suppress a change in shape of the lines of electric force at the end position of the junction segment CJ than the configurations illustrated in (b) and (d) of FIG. 6. This can suppress the reflection of the modulating signal which reflection can occur at the second end of the signal line 11a.

Embodiment 2

An optical modulator including a high-frequency circuit of Embodiment 2 of the present invention is described below with reference to FIG. 7. Note that members identical to those of Embodiment 1 are not described below.

Figure 7:
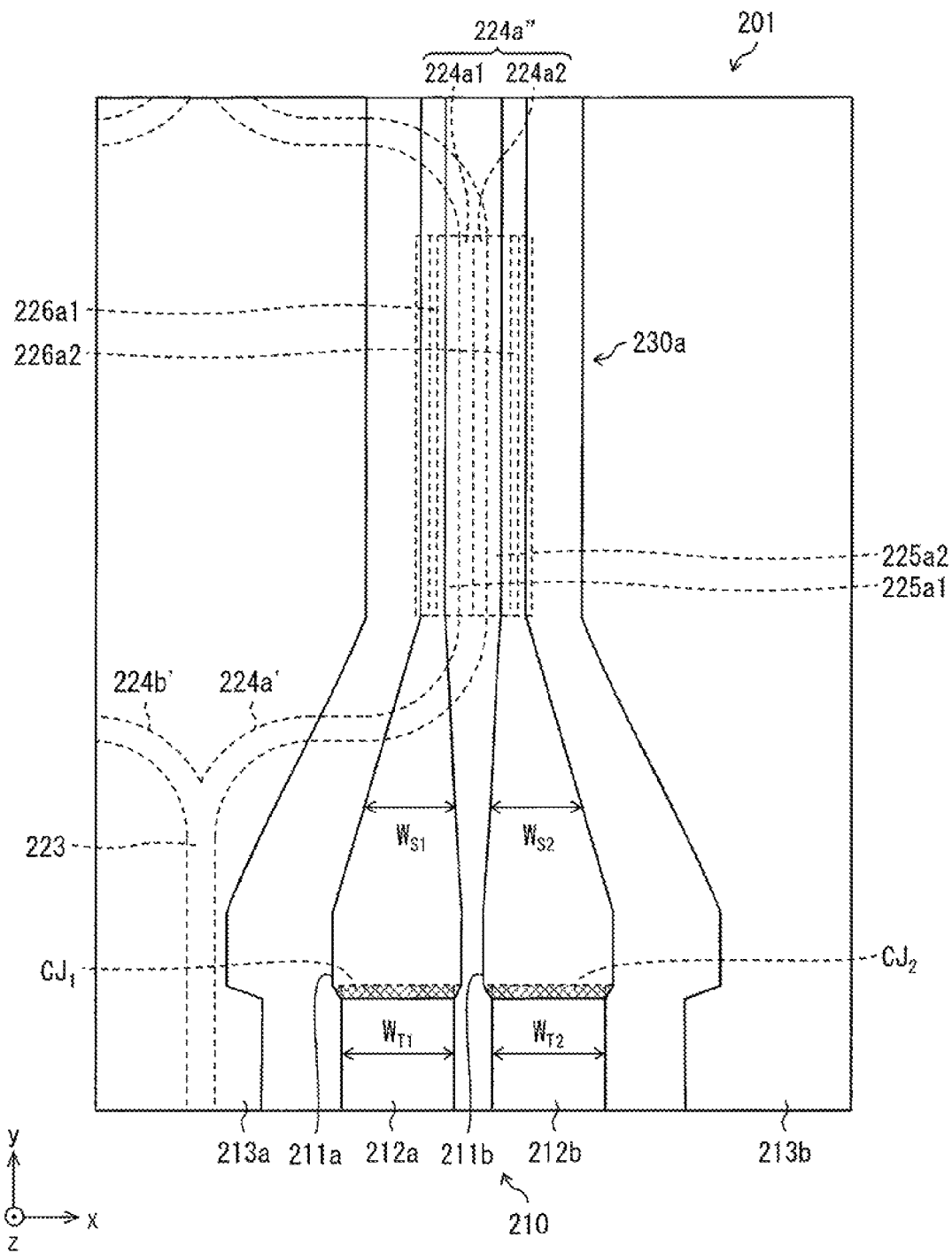
FIG. 7 is a top view of a high-frequency circuit of Embodiment 2 of the present invention.

FIG. 7 is a top view of a high-frequency circuit 210 of an optical modulator 201 of Embodiment 2. The optical modulator 201 of Embodiment 2 differs from the optical modulator 1 of Embodiment 1 of the present invention in the configuration of signal lines connected to a p-n junction 224a" of a first optical modulating section 230a. More specifically, the optical modulator 1 is configured such that the signal line 11a is connected to the p-type silicon waveguide 24a1 and the first ground line 13a is connected to the n-type silicon waveguide 24a2 (see (a) of FIG. 2). Thus, the optical modulator 1 modulates light through a single-ended operation in accordance with a modulating signal inputted to the signal line 11a. In contrast, as will be described below, the optical modulator 201 modulates light through a differential operation in accordance with modulating signals separately inputted to a first signal line 211a and a second signal line 211b. The term "differential operation" as used herein refers not to a differential operation between two arms (i.e. a first arm section and a second arm section) of an M-Z optical interferometer, but to an input of differential voltage signals, which serve as the modulating signals, to the first signal line 211a and the second signal line 211b to vary a carrier concentration in a single optical modulating section (i.e. the first optical modulating section 230a).

The first optical modulating section 230a includes: the p-n junction 224a", a slab 225a1, a slab 225a2, a traveling-wave electrode 226a1, and a traveling-wave electrode 226a2. The p-n junction 224a" includes a p-type silicon waveguide 224a1 and an n-type silicon waveguide 224a2. The p-type silicon waveguide 224a1 is connected to the first signal line 211a via the slab 225a1 and the traveling-wave electrode 226a1. Similarly, the n-type silicon waveguide 224a2 is connected to the second signal line 211b via the slab 225a2 and the traveling-wave electrode 226a2.

The first signal line 211a and the second signal line 211b are signal lines formed on a surface of an insulator layer of a substrate in which semiconductor layer and the insulator layer are stacked in this order. The first signal line 211a and the second signal line 211b both extend in a direction parallel to the y-axis, and each have a first end (i.e. an end facing in the positive direction of the y-axis) connected to a PPG (not illustrated). The PPG outputs, to each of the first and second signal lines 211a and 211b, a modulating signal that is a high-frequency signal.

A first termination resistor 212a and a second termination resistor 212b are resistive elements embedded to the surface of the insulator layer of the substrate in which the semiconductor layer and the insulator layer are stacked in this order. The first termination resistor 212a and the second termination resistor 212b each have an upper surface configured to be flush with the surface of the insulator layer. The first termination resistor 212a and the second termination resistor 212b may be made of (i) a conductive compound such as titanium nitride (ii) a p-type semiconductor obtained by doping a semiconductor such as silicon with a p-type dopant, or (iii) an n-type semiconductor obtained by doping a semiconductor such as silicon with an n-type dopant.

Let it be assumed below that the junction segment (first junction segment) $CJ_1$ of the first signal line 211a starts at a position (which serves as a starting position) short of a termination point (i.e. a second end; an end facing in the negative direction of the y-axis) of the first signal line 211a and ends at the termination point (which serves as an end position). The first junction segment $CJ_1$ covers a portion of an upper surface of the first termination resistor 212a, whereby the first signal line 211a and the first termination resistor 212a are connected to each other. Similarly, let it be assumed that the junction segment (second junction segment) $CJ_2$ of the second signal line 211b starts at a position (which serves as a start position) short of a termination point (i.e. a second end; an end facing in the negative direction of the y-axis) of the second signal line 211b and ends at the termination point (which serves as an end position). The second junction segment $CJ_2$ covers a portion of an upper surface of the second termination resistor 212b, whereby the second signal line 211b and the second termination resistor 212b are connected to each other.

A first ground line 213a is provided at a side of the first signal line 211a that faces in the negative direction of the x-axis, and a second ground line 213b is provided at a side of the second signal line 211b that faces in the positive direction of the x-axis. The first ground line 213a, the first termination resistor 212a, the second termination resistor 212b, and the second ground line 213b are connected to one another via capacitors by circuit lines (not illustrated).

The high-frequency circuit 210 of Embodiment 2 includes the first signal line 211a, the first termination resistor 212a, the first ground line 213a, the second signal line 211b, the second termination resistor 212b, and the second ground line 213b. The first signal line 211a, the first ground line 213a, the second signal line 211b, and the second ground line 213b are all circuit line patterns made of aluminum and coplanarly arranged on the surface of the insulator layer of the substrate.

Let it be assumed hereinafter that the width $W_{S1}$ is the length along the x-axis of the first signal line 211a and that the width $W_{S2}$ is the length along the x-axis of the second signal line 211b. Further, the width $W_{T1}$ is the length along the x-axis of the upper surface of the first termination resistor 212a, and the width $W_{T2}$ is the length along the x-axis of the upper surface of the second termination resistor 212b.

At the start position of the first junction segment $CJ_1$ (i.e. a side edge of the first termination resistor 212a that faces in the positive direction of the y-axis), the width $W_{S1}$ is greater than the width $W_{T1}$. Similarly, at the start position of the second junction segment $CJ_2$ (i.e. a side edge of the second termination resistor 212b that faces in the positive direction of the y-axis), the width $W_{S2}$ is greater than the width $W_{T2}$.

According to the configuration, the lines of electric force representing an electric field that is generated in the high-frequency circuit 210, less abruptly change in shape at the start position of the first junction segment $CJ_1$ and the start position of the second junction segment $CJ_2$ as compared with the high-frequency circuit 510 of the comparative example. This allows the high-frequency circuit 210 to suppress the reflection, at the start position of the first junction segment $CJ_1$, of the modulating signal inputted to the first signal line 211a, and to suppress the reflection, at the start position of the second junction segment $CJ_2$, of the modulating signal inputted to the second signal line 211b.

The width $W_{S1}$ gradually decreases from the start position of the first junction segment $CJ_1$ toward the end position of the first junction segment $CJ_1$, and the width $W_{S1}$ is equal to the width $W_{T1}$ at the end position of the first junction segment $CJ_1$. Similarly, the width $W_{S2}$ gradually decreases from the start position of the second junction segment $CJ_2$ toward the end position of the second junction segment $CJ_2$, and the width $W_{S2}$ is equal to the width $W_{T2}$ at the end position of the second junction segment $CJ_2$.

According to the configuration, the lines of electric force representing an electric field that is generated in the high-frequency circuit 210 do not abruptly change in shape at the end position of the first junction segment $CJ_1$ and the end position of the second junction segment $CJ_2$. Therefore, the high-frequency circuit 210 can further suppress the reflection, at the end position of the first junction segment $CJ_1$, of the modulating signal inputted to the first signal line 211a, and can further suppress the reflection, at the end position of the second junction segment $CJ_2$, of the modulating signal inputted to the second signal line 211b, as compared with a case where the width $W_{S1}$ of the first signal line 211a at the end position of the first junction segment $CJ_1$ is greater than the width $W_{T1}$ and the width $W_{S2}$ of the second signal line 211b at the end position of the second junction segment $CJ_2$ is greater than the width $W_{T2}$.

Embodiment 2 has been described with respect to a method for inputting differential voltage signals, which serve as the modulating signals, to the first signal line 211a and the second signal line 211b to vary a carrier concentration in a silicon modulating section. However, the invention of Embodiment 2 is not limited to this, and is also applicable to a case where a differential operation is carried out with respect to two arms (a first arm section and a second arm section) of an M-Z optical interferometer.

Embodiment 3

An optical modulator including a high-frequency circuit of Embodiment 3 of the present invention is described below with reference to FIG. 8. Note that members identical to those of Embodiment 1 are not described below.

Figure 8:
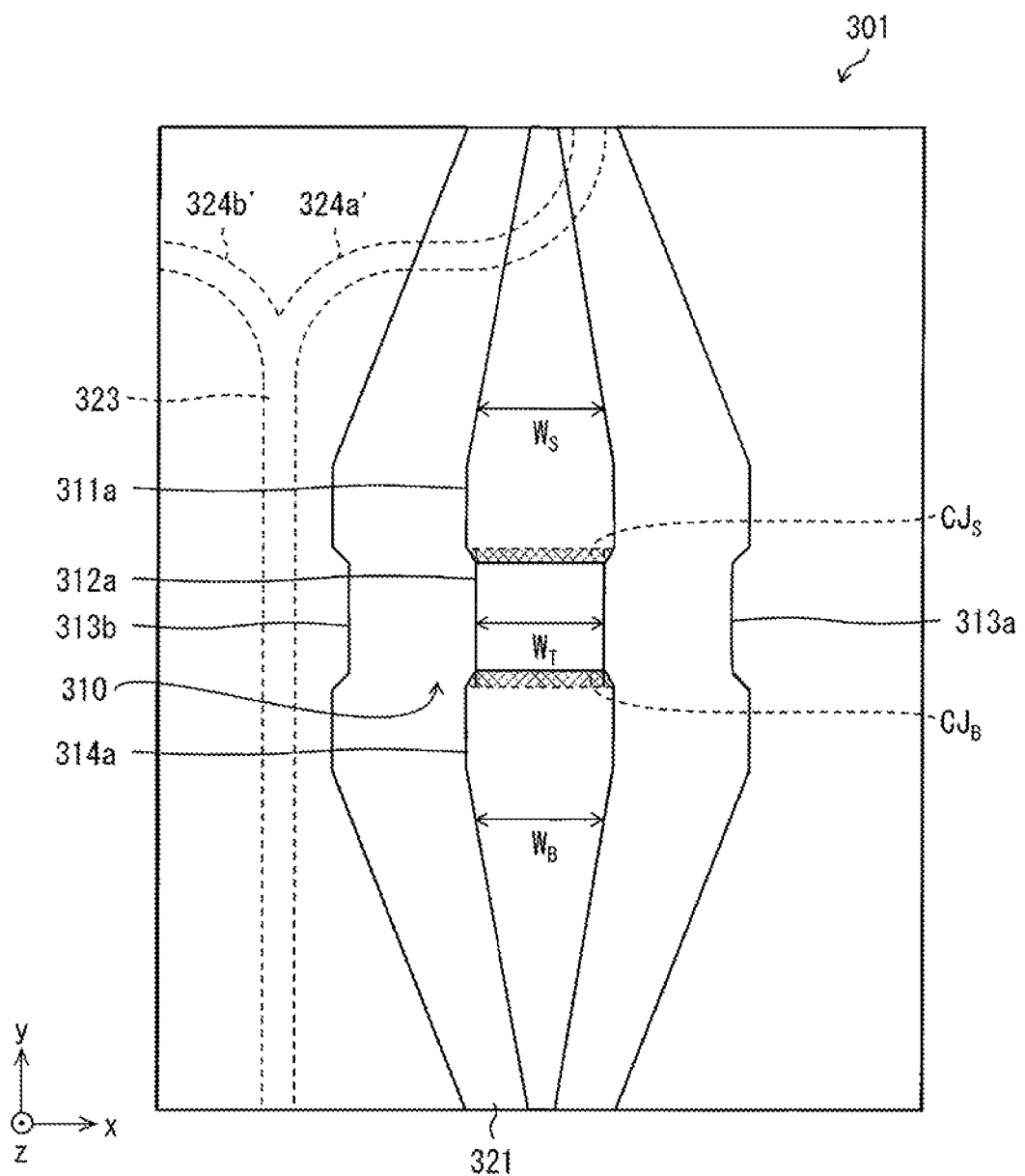
FIG. 8 is a top view of a high-frequency circuit of Embodiment 3 of the present invention.

FIG. 8 is a top view of a high-frequency circuit 310 of an optical modulator 301 of Embodiment 3. The high-frequency circuit 310 of Embodiment 3 differs from the high-frequency circuit 10 of Embodiment 1 of the present invention in that the high-frequency circuit 310 of Embodiment 3 includes a bias signal line 314a.

Specifically, the high-frequency circuit 310 includes a signal line 311a, a termination resistor 312a, a first ground line 313a, a second ground line 313b, and a bias signal line 314a. The bias signal line 314a is a circuit line pattern through which a DC bias voltage is applied to a p-type silicon waveguide of a p-n junction of a first optical modulating section of the optical modulator 301. Further, as with the signal line 311a, the first ground line 313a, and the second ground line 313b, the bias signal line 314a is a circuit line pattern made of aluminum and coplanarly arranged on a surface of an insulator layer of a substrate 321.

As illustrated in FIG. 8, the bias signal line 314a extends in a direction parallel to the y-axis on the surface of the insulator layer of the substrate in which a semiconductor layer and the insulator layer are stacked in this order. The bias signal line 314a has a first end (i.e. an end facing in the negative direction of the y-axis) connected to a direct voltage generator source (not illustrated). The bias signal line 314a has a junction segment $CJ_B$ defined as a segment that starts at a position (which serves as a start position) short of a second end (i.e. a termination point; facing in the positive direction of the y-axis) of the bias signal line 314a and ends at the termination point (which serves as an end position). The junction segment $CJ_B$ of the bias signal line 314a covers a portion of the upper surface of the termination resistor 312a, whereby the junction segment $CJ_B$ is connected to the termination resistor 312a from the start position to the end position. As will be described later, the width of the bias signal line 314a at the start position of the junction segment $CJ_B$ is greater than the width of the upper surface of the termination resistor 312a. Therefore, a portion along the width of the bias signal line 314a that extends from the start position to the end position is connected to the termination resistor 312a.

Note that as in the case of the signal line 11a of Embodiment 1, the signal line 311a is connected to the termination resistor 312a via the junction segment $CJ_S$ covering a portion of the upper surface of the termination resistor 312a.

Let it be assumed here that the width $W_B$ is the length along the x-axis of the bias signal line 314a and that the width $W_T$ is the length along the x-axis of the upper surface of the termination resistor 312a. At the start position of the junction segment $CJ_B$ (i.e. a side edge of the termination resistor 312a that faces in the negative direction of the y-axis), the width WB is greater than the width $W_T$. Further, the width WB of the bias signal line 314a preferably gradually decreases from the start position of the junction segment $CJ_B$ toward the end position (i.e. an end of the bias signal line 314a; a side edge facing in the positive direction of the y-axis) of the junction segment $CJ_B$ and is preferably equal to the width $W_T$ at the end position of the junction segment $CJ_B$. In other words, the bias signal line 314a as viewed from above in the junction segment $CJ_B$ preferably has such a taper shape that the width WB gradually decreases from the start position of the junction segment $CJ_B$ toward the end position of the junction segment $CJ_B$.

According to the configuration, even in a case where a modulating signal inputted from the signal line 311a to the termination resistor 312a reaches the junction segment $CJ_B$ without having its voltage sufficiently lowered, lines of electric force attributed to the modulating signal do not abruptly change in shape at the start position of the junction segment $CJ_B$. This allows the high-frequency circuit 310 to suppress the reflection, at the start position of the junction segment $CJ_B$, of the modulating signal inputted to the termination resistor 312a.

Further, the lines of electric force attributed to the modulating signal do not abruptly change in shape at the end position of the junction segment $CJ_B$. This allows the high-frequency circuit 310 to suppress the reflection, at the end position of the junction segment $CJ_B$, of the modulating signal inputted to the termination resistor 312a.

Note that the configuration and the effect of the signal line 311a, which are identical to those of the signal line 11a of the high-frequency circuit 10 of Embodiment 1, are not described here.

(Modifications of the High-frequency Circuit 310)

Embodiment 3 has been described assuming that the width WB is equal to the width $W_T$ at the end position of the junction segment $CJ_B$. Alternatively, as in the case of the high-frequency circuit 10 of Modification 1 illustrated in FIG. 4, the high-frequency circuit 310 may be configured such that the width WB is greater than the width $W_T$ at the end position of the junction segment $CJ_B$.

Alternatively, as in the case of the high-frequency circuit 10 of Modification 2 illustrated in FIG. 5, the high-frequency circuit 310 may be configured such that the width WB of the bias signal line 314a is equal to the width $W_T$ at both the start position of the junction segment $CJ_B$ and the end position of the junction segment $CJ_B$.

Also in these modifications of the high-frequency circuit 310, lines of electric force attributed to a modulating signal inputted from the signal line 311a to the termination resistor 312a and having reached the bias signal line 314a do not abruptly change in shape at the start position of the junction segment $CJ_B$. This allows the high-frequency circuit 310 to suppress the reflection, at the start position of the junction segment $CJ_B$, of the modulating signal inputted to the termination resistor 312a.

CONCLUSION

In order to attain the object, a high-frequency circuit of the present invention includes: a termination resistor embedded to a surface of a substrate; and a signal line formed on the surface of the substrate, the signal line having a junction segment that starts at a start position and ends at an end position, the start position being short of a termination point of the signal line, the end position being the termination point, the junction segment covering a portion of an upper surface of the termination resistor so that at least a portion along a width of the junction segment that extends from the start position to the end position is connected to the termination resistor, a width of the signal line at the start position of the junction segment being equal to or greater than a width of the upper surface of the termination resistor at the start position.

The termination resistor is provided as a layer below the signal line in a segment in which the signal line and the termination resistor are connected to each other, i.e., the junction segment. Thus, a relative arrangement of the signal line and the termination resistor is not a coplanar arrangement. In other words, a structure constituting the layer below the signal line discontinuously changes from the substrate to the termination resistor when viewed from a high-frequency signal propagated through the signal line toward the termination resistor. Such a discontinuous structure at the start position of the junction segment, which start position serves as a boundary between the substrate and the termination resistor, is a cause of a considerable change in shape of lines of electric force generated around the signal line and the termination resistor.

The high-frequency circuit of the present invention is configured such that the width of the signal line is equal to or greater than the width of the termination resistor at the start position of the junction segment. Thus, although the signal line and the termination resistor are not coplanarly arranged, it is possible to suppress a change in shape, at the start position, of the lines of electric force attributed to the high-frequency signal propagating through the signal line. In other words, it is possible to suppress (i) an impedance mismatch between the signal line and the termination resistor and (ii) the reflection of the high-frequency signal at the start position.

Accordingly, the configuration makes it possible to suppress the reflection of the high-frequency signal propagating through the signal line, the reflection being caused by the discontinuous structure caused by the substrate and the termination resistor that are provided at a layer below the signal line, and to achieve a high-frequency circuit which can suppress the reflection of the high-frequency signal inputted to the signal line.

The high-frequency circuit according to an aspect of the present invention is preferably configured such that the width of the signal line at the start position is greater than the width of the upper surface of the termination resistor at the start position.

According to the configuration, since the width of the signal line is greater than the width of the termination resistor at the start position, right and left ends of the signal line are formed not on the termination resistor but on the substrate. This can suppress an influence of the termination resistor having a dielectric constant different from that of the substrate on the lines of electric force at the start position. Accordingly, the configuration can further suppress a change in shape of the lines of electric force at the start position than a case where the width of the signal line is equal to the width of the termination resistor at the start position. In other words, it is possible to more effectively suppress the reflection of the high-frequency signal propagating through the signal line, the reflection being caused by the discontinuous structure.

The high-frequency circuit according to an aspect of the present invention is preferably configured such that the width of the signal line in the junction segment gradually decreases from the start position toward the end position so as to be equal to or smaller than the width of the upper surface of the termination resistor at the end position.

According to the configuration, in the junction segment between the signal line and the termination resistor, the signal line has such a taper shape that the width of the signal line decreases from the start position of the junction segment toward the end position (can also be reworded as an end position of a junction), and the width of the signal line is configured to be equal to or smaller than the width of the termination resistor at the end position. In other words, the width of the signal line is configured to be equal to or smaller than the width of the upper surface of the termination resistor at any position in the segment from the start position to the end position. In view of this, the lines of electric force do not abruptly change in shape not only at the start position of the junction segment but also from the start position to the end position of the junction segment. This makes it possible to suppress the reflection, at the junction segment, of the high-frequency signal propagating through the signal line.

The high-frequency circuit according to an aspect of the present invention is preferably configured such that, in a case where a region of the junction segment in which region the junction segment is joined to the termination resistor is a junction region, a ratio of an area of the junction region to an area of the upper surface of the termination resistor is 1% or higher and 10% or lower.

For the purpose of downsizing a high-frequency circuit (designing a compact high-frequency circuit), the junction region preferably has an area that is as small as possible. On the other hand, for the purpose of reducing contact resistance between the signal line and the termination resistor, the junction region preferably has an area that is as large as possible. To achieve both of the two purposes, the ratio is preferably 1% or higher and 10% or lower. The ratio that is 1% or higher allows a reduction in contact resistance between the signal line and the termination resistor to a value that practically causes no problem. Meanwhile, the ratio that is 10% or lower allows the junction segment, in which the termination resistor is provided below the signal line, to have a shorter length, so that a junction in which the signal line and the pair of ground lines are not coplanarly arranged can be made shorter. This makes it easy to match an impedance of the signal line and an impedance of the termination resistor to each other. Further, it is unnecessary to make the high-frequency circuit according to an aspect of the present invention unnecessarily large.

The high-frequency circuit according to an aspect of the present invention is preferably configured to further include a pair of ground lines, the signal line and the pair of ground lines being coplanarly arranged.

The configuration, which makes it only necessary to provide both the pair of ground lines and the signal line on the surface of the substrate, facilitates a fabricating process. The configuration also allows the impedance to be adjusted in a wider range, and makes it easy to maintain the impedance of the signal line at a constant value and to suppress a loss of the high-frequency signal inputted to a signal line. Further, the configuration allows a theoretically calculated characteristic impedance to be well matched to an actual characteristic impedance. This makes it easy to design a high-frequency circuit.

The high-frequency circuit according to an aspect of the present invention is preferably configured such that the substrate is a silicon on insulator (SOI) substrate.

The configuration makes it possible to fabricate the high-frequency circuit by use of a low cost SOI substrate. Further, it is possible to use an already established silicon device fabrication process as a process for fabricating the high-frequency circuit. In view of the above, it is possible to fabricate the high-frequency circuit at lower cost.

The high-frequency circuit according to an aspect of the present invention is preferably configured such that the termination resistor is made of a p-type semiconductor or an n-type semiconductor.

The configuration makes it possible to fabricate the high-frequency circuit by use of a silicon process having matured in a semiconductor field. Thus, the high-frequency circuit can be made smaller and integrated. Further, the high-frequency circuit can be made lower in cost by use of a substrate having a large area.

The high-frequency circuit according to an aspect of the present invention may be configured such that the termination resistor is made of titanium nitride.

The configuration allows the termination resistor to be made of a metallic compound which is different from the p-type semiconductor or the n-type semiconductor.

The high-frequency circuit according to an aspect of the present invention is preferably configured to further include a bias signal line formed on the surface of the substrate, the bias signal line having a junction segment that starts at a start position and ends at an end position, the start position being short of a termination point of the bias signal line, the end position being the termination point, the junction segment covering a portion of the upper surface of the termination resistor so that at least a portion along a width of the junction segment that extends from the start position to the end position is connected to the termination resistor, a width of the bias signal line at the start position of the junction segment being equal to or greater than the width of the upper surface of the termination resistor at the start position.

The high-frequency circuit according to an aspect of the present invention defines, as a junction segment of the bias signal line formed on the surface of the substrate, a segment of the bias signal line, the segment starting at a start position and ending at an end position, the start position being short of a termination point of the bias signal line, the end position being the termination point. The junction segment of the bias signal line covers a portion of the upper surface of the termination resistor, whereby the bias signal line and the termination resistor are connected to each other. The termination resistor is provided at a layer below the bias signal line in a region where the bias signal line is connected to the termination resistor. This means that a relative arrangement of the bias signal line and the termination resistor is not a coplanar arrangement. In other words, in a case where the high-frequency signal propagating through the signal line toward the termination resistor reaches the bias signal line without being sufficiently attenuated by the termination resistor, the structure constituting the layer below the bias signal line can be said to discontinuously change from the termination resistor to the substrate when viewed from such a high-frequency signal. Such a discontinuous structure at the start position of the junction segment of the bias signal line, which start position serves as a boundary between the termination resistor and the substrate, can be a cause of a considerable change in shape of the lines of electric force generated around the termination resistor and the bias signal line.

However, according to the above configuration, the width of the bias signal line is equal to or greater than the width of the upper surface of the termination resistor at the start position of the junction segment of the bias signal line. Thus, although the bias signal line and the termination resistor are not coplanarly arranged, it is possible to suppress a change in shape, at the start position, of the lines of electric force attributed to the high-frequency signal reaching the bias signal line. In other words, it is possible to suppress (i) an impedance mismatch between the termination resistor and the bias signal line and (ii) the reflection of the high-frequency signal at the start position. Accordingly, the configuration makes it possible to suppress the reflection of the high-frequency signal reaching the bias signal line, the reflection being caused by the discontinuous structure caused by the substrate and the termination resistor that are provided at the layer below the bias signal line.

An optical modulator according to an aspect of the present invention preferably includes: a high-frequency circuit according to any one of the aspects of the present invention; and a Mach-Zehnder optical interferometer including an optical modulating section provided on at least one of arm sections, the high-frequency circuit being connected to at least one of a pair of electrodes of the optical modulating section.

According to the above configuration, the optical modulator yields an effect identical to that yielded by the high-frequency circuit according to an aspect of the present invention.

The optical modulator according to an aspect of the present invention is preferably configured such that the pair of electrodes is traveling-wave electrodes.

According to the above configuration, since the pair of electrodes is traveling-wave electrodes, a direction in which the high-frequency signal propagates the pair of electrodes and a direction in which the light is propagated through the waveguide are identical. This can suppress a deterioration in modulated optical signal.

The optical modulator according to an aspect of the present invention is preferably configured such that: the width of the signal line at a connection between the signal line and each of the traveling-wave electrodes is smaller than the width of the signal line at the start position of the junction segment; and the width of the signal line gradually increases from the connection between the signal line and each of the traveling-wave electrodes toward the start position.

In a case where a resistance value of the termination resistor is to be set at a desired value, the termination resistor normally has a greater width than the traveling-wave electrodes. Meanwhile, it is not preferable to set the width of the traveling-wave electrodes to be greater than the width of the termination resistor throughout all the segment of the signal line including the junction segment. This is because such setting makes the optical modulator unnecessarily large.

According to the configuration, the termination resistor which has a greater width than the traveling-wave electrodes can suppress an increase in size of the optical modulator. Further, the signal line has such a taper shape that the width of the signal line gradually increases from the connection between the signal line and each of the traveling-wave electrodes toward the start position of the junction segment. This can suppress an abrupt change in impedance of the signal line.

The optical modulator according to an aspect of the present invention is preferably configured such that the Mach-Zehnder optical interferometer includes a waveguide having a segment in which the traveling-wave electrodes are provided and which serves as a lateral p-n junction including p-type silicon and n-type silicon.

According to the above configuration, it is possible to use the high-frequency circuit according to an aspect of the present invention in a portion of a silicon optical modulator including, as a waveguide, a lateral p-n junction including p-type silicon and n-type silicon. Note that the silicon optical modulator is known as an optical modulator that is small and low in fabrication cost. Application of the high-frequency circuit to such a silicon optical modulator allows the silicon optical modulator to be made still smaller and still lower in cost.

[Supplementary Note]

The present invention is not limited to the description of the embodiments above, but may be altered within the scope of the claims. An embodiment based on a combination of technical means described in different embodiments is encompassed in the technical scope of the present invention.

INDUSTRIAL APPLICABILITY

The present invention is applicable to a high-frequency circuit to which a high-frequency signal is inputted from an outside source.

REFERENCE SIGNS LIST

1 Optical modulator
10 High-frequency circuit
11a Signal line
12a Termination resistor
13a First ground line
13b Second ground line
21 Substrate
21a Semiconductor layer
21b Insulator layer
21b1 First insulator layer
21b2 Second insulator layer
22 Entrance waveguide
23 Exit waveguide
24a First arm section
24a' Waveguide section
24a" P-n junction
24a1 P-type silicon waveguide
24a2 N-type silicon waveguide
24b Second arm section
25a1 Slab
25a2 Slab
26a1 Traveling-wave electrode
26a2 Traveling-wave electrode
30a First optical modulating section
30b Second optical modulating section

The invention claimed is:

1. A high-frequency circuit comprising:
   a termination resistor embedded to a surface of a substrate; and
   a signal line formed on the surface of the substrate, the signal line having a junction segment that starts at a start position and ends at an end position, the start position being short of a termination point of the signal line, the end position being the termination point, the junction segment covering a portion of an upper surface of the termination resistor so that at least a portion along a width of the junction segment that extends from the start position to the end position is connected to the termination resistor,
   a width of the signal line at the start position of the junction segment being equal to or greater than a width of the upper surface of the termination resistor at the start position.

2. The high-frequency circuit according to claim 1, wherein the width of the signal line at the start position is greater than the width of the upper surface of the termination resistor at the start position.

3. The high-frequency circuit according to claim 1, wherein the width of the signal line in the junction segment gradually decreases from the start position toward the end position so as to be equal to or smaller than the width of the upper surface of the termination resistor at the end position.

4. The high-frequency circuit according to claim 1, wherein, in a case where a region of the junction segment in which region the junction segment is joined to the termination resistor is a junction region, a ratio of an area of the junction region to an area of the upper surface of the termination resistor is 1% or higher and 10% or lower.

5. The high-frequency circuit according to claim 1, further comprising a pair of ground lines,
   the signal line and the pair of ground lines being coplanarly arranged.

6. The high-frequency circuit according to claim 1, wherein the substrate is a silicon on insulator (SOI) substrate.

7. The high-frequency circuit according to claim 1, wherein the termination resistor is made of a p-type semiconductor or an n-type semiconductor.

8. The high-frequency circuit according to claim 1, wherein the termination resistor is made of titanium nitride.

9. The high-frequency circuit according to claim 1, further comprising a bias signal line formed on the surface of the substrate, the bias signal line having a junction segment that starts at a start position and ends at an end position, the start position being short of a termination point of the bias signal line, the end position being the termination point, the junction segment covering a portion of the upper surface of the termination resistor so that at least a portion along a width of the junction segment that extends from the start position to the end position is connected to the termination resistor,
   a width of the bias signal line at the start position of the junction segment being equal to or greater than the width of the upper surface of the termination resistor at the start position.

10. An optical modulator comprising:
    a high-frequency circuit according to claim 1; and
    a Mach-Zehnder optical interferometer including an optical modulating section provided on at least one of arm sections,
    the high-frequency circuit being connected to at least one of a pair of electrodes of the optical modulating section.

11. The optical modulator according to claim 10, wherein the pair of electrodes is traveling-wave electrodes.

12. The optical modulator according to claim 11, wherein:
    the width of the signal line at a connection between the signal line and each of the traveling-wave electrodes is smaller than the width of the signal line at the start position of the junction segment; and
    the width of the signal line gradually increases from the connection between the signal line and each of the traveling-wave electrodes toward the start position.

13. The optical modulator according to claim 11, wherein the Mach-Zehnder optical interferometer includes a waveguide having a segment in which the traveling-wave electrodes are provided and which serves as a lateral p-n junction including p-type silicon and n-type silicon.

* * * * *